United States Patent
Bedal et al.

(10) Patent No.: US 8,119,053 B1
(45) Date of Patent: Feb. 21, 2012

(54) APPARATUS FOR THREE DIMENSIONAL PRINTING USING IMAGED LAYERS

(75) Inventors: Bryan Bedal, Santa Clarita, CA (US); Steven E. Schell, Monrovia, CA (US); Ross D. Beers, La Crescenta, CA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 11/998,151

(22) Filed: Nov. 28, 2007

Related U.S. Application Data

(63) Continuation-in-part of application No. 11/890,984, filed on Aug. 8, 2007, now abandoned, which is a continuation of application No. 11/078,894, filed on Mar. 11, 2005, now Pat. No. 7,261,542.

(60) Provisional application No. 60/554,251, filed on Mar. 18, 2004, provisional application No. 60/872,041, filed on Nov. 29, 2006.

(51) Int. Cl.
*B28B 1/16* (2006.01)
*B29C 35/08* (2006.01)

(52) U.S. Cl. ...... 264/308; 264/497; 425/375; 425/174.4

(58) Field of Classification Search ............... 425/174.4, 425/375; 264/308, 401, 497
See application file for complete search history.

(56) References Cited

U.S. PATENT DOCUMENTS

| | | | | |
|---|---|---|---|---|
| 5,192,559 A | * | 3/1993 | Hull et al. | 425/89 |
| 5,575,597 A | * | 11/1996 | Bailey et al. | 409/201 |
| 5,932,309 A | * | 8/1999 | Smith et al. | 428/46 |
| 6,042,774 A | * | 3/2000 | Wilkening et al. | 264/497 |
| 6,206,672 B1 | * | 3/2001 | Grenda | 425/174.4 |
| 2002/0145213 A1 | * | 10/2002 | Liu et al. | 264/40.1 |

FOREIGN PATENT DOCUMENTS

WO  WO 9222430  12/1992

OTHER PUBLICATIONS

European Search Report for European Application No. EP 05725865.

* cited by examiner

*Primary Examiner* — Maria Veronica Ewald
(74) *Attorney, Agent, or Firm* — Andrew Naglestad; Keith A. Roberson

(57) ABSTRACT

A three-dimensional printer adapted to construct three dimensional objects is disclosed. In an exemplary embodiment, the printer includes a first surface adapted to receive a bulk layer of sinterable powder, a polymer such as nylon powder; a radiant energy source, e.g., an incoherent heat source adapted to focus the heat energy to sinter an image from the layer of sinterable powder; and a transfer mechanism adapted to transfer or print the sintered image from the first surface to the object being assembled while fusing the sintered image to the object being assembled. The transfer mechanism is preferably adapted to simultaneously deposit and fuse the sintered image to the object being assembled. The process of generating an image and transferring it to the object being assembled is repeated for each cross section until the assembled object is completed.

12 Claims, 18 Drawing Sheets

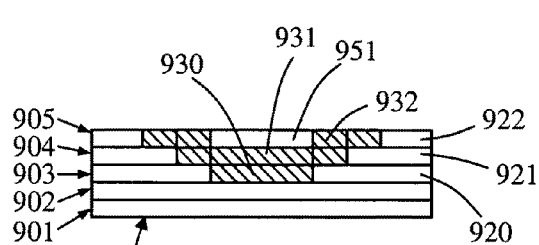
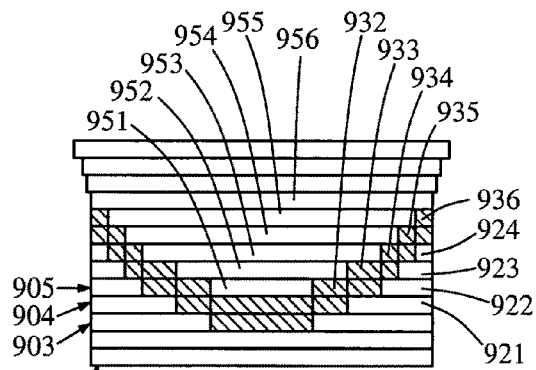
FIG. 9A
FIG. 9B
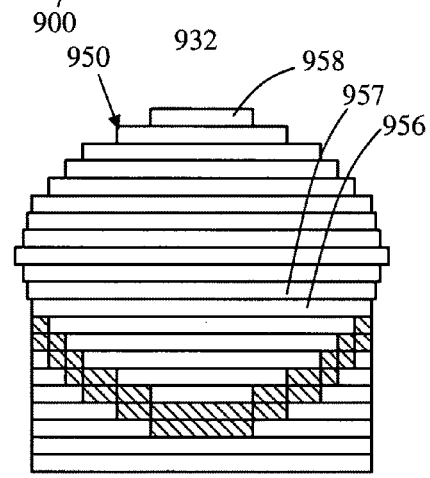
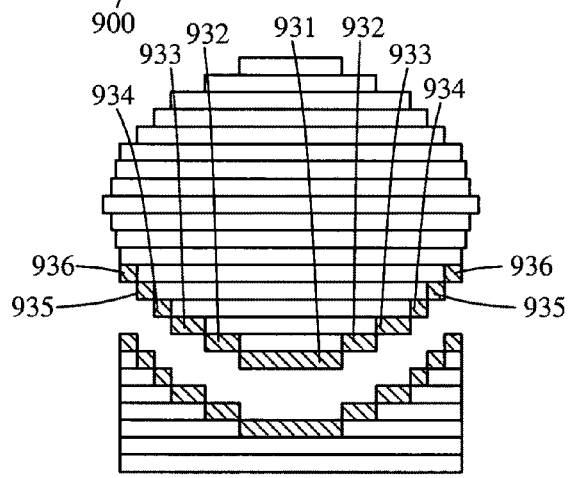
FIG. 9C
FIG. 9D
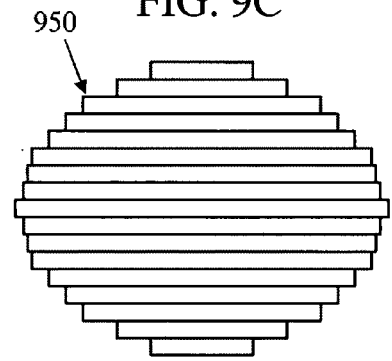
FIG. 9E

APPARATUS FOR THREE DIMENSIONAL PRINTING USING IMAGED LAYERS

CROSS-REFERENCE TO RELATED APPLICATION

This application is a continuation-in-part of U.S. patent application Ser. No. 11/890,984, filed Aug. 8, 2007 now abandoned, which is a continuation of U.S. patent application Ser. No. 11/078,894, filed on Mar. 11, 2005, now issued as U.S. Pat. No. 7,261,542, which claims the benefit of U.S. Provisional Patent Application Ser. No. 60/554,251, filed Mar. 18, 2004, entitled "Three Dimensional Printing," each of which is hereby incorporated by reference herein for all purposes. This application also claims the benefit of U.S. Provisional Patent Application Ser. No. 60/872,041, filed Nov. 29, 2006.

TECHNICAL FIELD

The present invention relates to a system and method for generating three dimensional objects from a plurality of cross sectional information. In particular, the invention relates to a system and method for constructing three dimensional objects using inexpensive sources of heat and simple motion systems.

BACKGROUND

Three dimensional (3D) printers and rapid prototyping (RP) systems are currently used primarily to quickly produce objects and prototype parts from 3D computer-aided design (CAD) tools. Most RP systems use an additive, layer-by-layer approach to building parts by joining liquid, powder, or sheet materials to form physical objects. The data referenced in order to create the layers is generated from the CAD system using thin, horizontal cross-sections of the model. The prior art 3D printing systems that require heat to join the materials together generally employ high powered lasers and high precision motion systems containing a multitude of actuators to generate parts; resulting in a 3D printer which is generally too expensive for the home/hobbyist user or small mechanical design groups. There is therefore a need for 3D printers and RP systems that can generate parts on a layer-by-layer basis without a high power laser or other expensive energy source and with less expensive motion systems.

SUMMARY

The invention features a three-dimensional printer (3DP) adapted to construct three dimensional objects from cross sectional layers of the object that are formed on one surface, then subsequently adhered to the stack of previously formed and adhered layers. In the preferred embodiment, the 3DP includes a first surface adapted to receive a bulk layer of sinterable powder; a radiant energy source adapted to fuse a select portion of the layer of sinterable powder to form a sintered image; and a transfer mechanism adapted to concurrently transfer or print the sintered image from the first surface to the object being assembled while fusing the sintered image to the object being assembled. The layer of sinterable powder is preferably a polymer such as nylon that may be fused on a roller or drum, for example, with the energy provided by an incoherent heat source such as a halogen lamp. The transfer mechanism includes one or more actuators and associated controls adapted to simultaneously roll and translate the drum across the object being assembled so as to press and fuse the sintered image to the object. The transfer mechanism may further include a transfixing heater for heating the sintered image and the object immediately before the layer is applied to the object. The process of generating an image and transferring it to the object being assembled is typically repeated for each cross section until the assembled object is completed.

In some embodiments, the 3DP includes a powder applicator adapted to apply a predetermined quantity of sinterable powder to the drum for sintering. In the preferred embodiment, the applicator extracts the sinterable powder from a reservoir and permits the powder to briefly free fall, thereby separating the particles that may have compacted in the reservoir and normalizing the density of the particles applied in layer form to the drum. The powder applicator may further include a blade which, when placed a select distance from and angle relative to the drum, produces a layer of sinterable powder with uniform thickness and density on the drum as the drum is rotated.

In some embodiments, the drum of the 3DP includes a temperature regulator and drum heating element adapted to heat the temperature of the drum at or near the fusing point of the sinterable powder to reduce the energy required by the radiant energy source to print a sintered image from the layer of bulk powder on the drum. The 3DP may further include a first heating element, a second heating element, or both to reduce the energy required to fuse the sintered image to the object being assembled. The first heating element, which is incorporated into a platform assembly on which the object is assembled, for example, is adapted to hold the object at a first predetermined temperature above the ambient temperature. The second heating element is preferably a hot pad adapted to contact and maintain the temperature of the upper surface of the object being assembled at a second determined temperature until the next sintered image is applied to the upper surface. The second determined temperature is less than the melting temperature of the sinterable powder.

The 3DP in some embodiments further includes a layer thickness control processor adapted to regulate the thickness of a sintered image fused to the object being assembled. The layer thickness control processor may vary the thickness of the sintered image before or after transferring to the object being assembled by, for example, varying the quantity of sinterable powder dispensed by the applicator, regulating the position of an applicator blade with respect to the drum, regulating the time and pressure applied by the drum to transfer the sintered image to the object being assembled, compressing the sintered image after it is fused to the object being assembled, and removing excess material from the object being assembled by means of a material removal mechanism.

BRIEF DESCRIPTION OF THE DRAWINGS

The present invention is illustrated by way of example and not limitation in the figures of the accompanying drawings, and in which:

FIGS. 9A-9E are cross sectional diagrams demonstrating the formation of an object using a partially sintered support structure in accordance with an embodiment of the present invention;

DETAILED DESCRIPTION OF THE PREFERRED EMBODIMENT

Figure 1A:
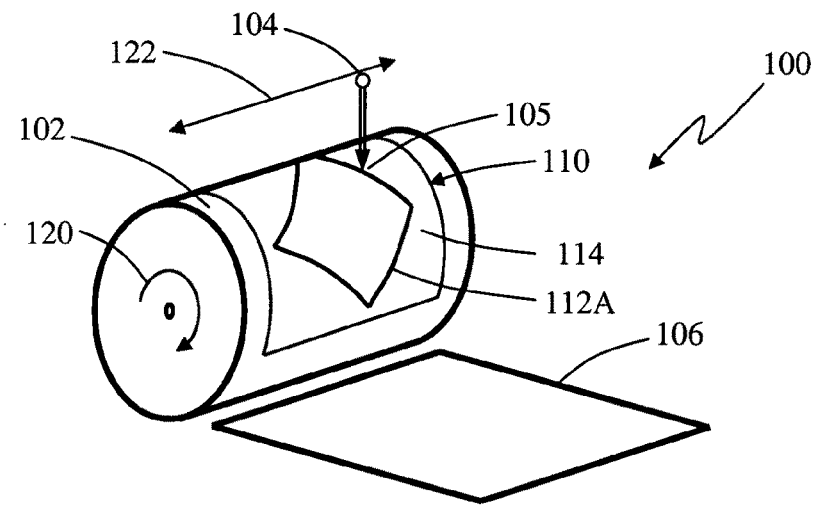
FIGS. 1A-1C are schematic diagrams demonstrating the operation of the three dimensional printer of the first preferred embodiment of the present invention.
Figure 1B:
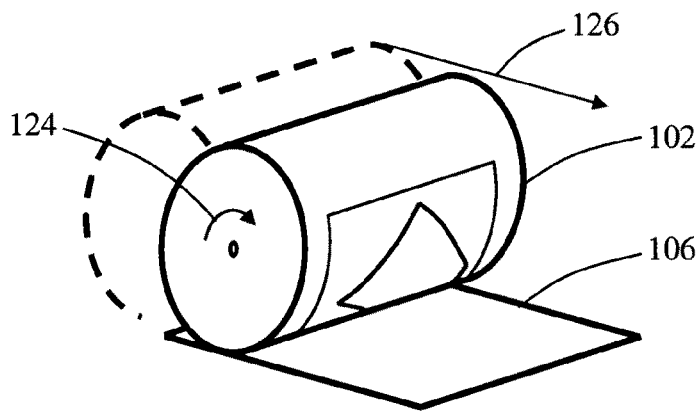
Figure 1C:
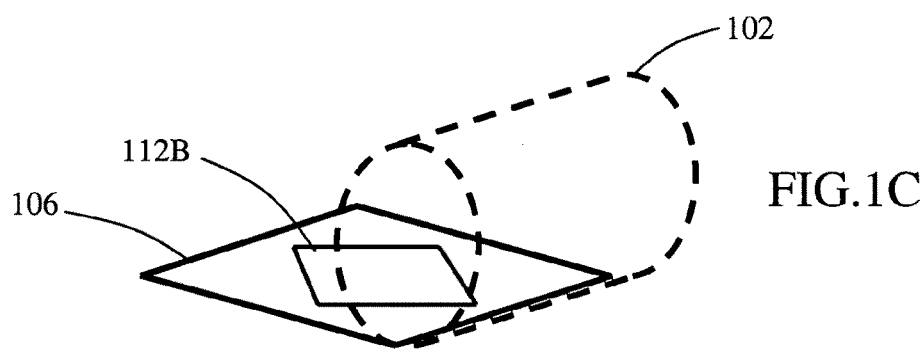

Illustrated in FIGS. 1A-1C is a schematic diagram demonstrating the operation of the three dimensional printer (3DP) of the first preferred embodiment. The 3DP 100 is adapted to construct a three dimensional (3D) part or object from a digital model of the object using a plurality of layers corresponding to cross sectional layers of the object. In the preferred embodiment, the cross sectional layers are formed from a powder whose particles can be sintered, i.e., to be formed into a coherent mass by heating. The layers of sintered powder referred to as sintered images are individually generated and sequentially assembled or printed onto a stack to build the object. Heat is used to fuse particles of the powder together to form individual layers as well as fuse individual layers together into the 3D object.

As illustrated in FIG. 1A, the 3DP 100 preferably includes a layer processing surface 102, a radiant energy source 104, and a work surface 106. The layer processing surface, e.g., the continuous surface of a process drum 102 or a planar surface, is adapted to rotate 120 about its longitudinal axis and pass over the work surface in a translational motion under the control of a microprocessor (not shown) and transfer or otherwise deposit the layers of sintered powder onto the work surface. The work surface is either a build surface on which the first sintered image is deposited or a preceding sintered image on the object being assembled. When produced on a layer processing surface separate from the object being assembled, the sintered image is permitted to express any distortion due to melting and density changes, for example, before the sintered image is affixed to the object, thereby reducing internal stresses that may arise in the object. As described below, production of the sintered image on the continuous surface of the drum 102 or other heated layer processing surface does not, in the preferred embodiment, typically require the energy required to concurrently fuse the image to the previous layer.

In the preferred embodiment, the process drum 102 includes a heating element (not shown) adapted to elevate the temperature of the outer surface of the drum to a predetermined value near the melting temperature of the sinterable powder employed. In the preferred embodiment, the sinterable powder is a crystalline nylon powder and the temperature to which the outer surface of the drum is raised is preferably low enough to prevent the powder from fully fusing but high enough above the ambient temperature of the sinterable powder to reduce the energy that must be injected to fuse the powder into a sintered image and subsequently, to weld or otherwise adhere the sintered image to the object under construction. A uniform layer of sinterable powder 110 is applied in bulk to drum 102. The sinterable powder, which is made tacky by the heat of the drum 102, adheres to the drum without the particles of the layer 110 fusing together. Electrostatic attraction may also be used in combination with a heated drum or alone with an unheated drum to releasably or removably adhere sinterable powder to the drum 102.

Portions of the layer of sinterable powder 110 representing a cross sectional layer of the object being formed are sintered by a radiant energy source 104. The energy source 104, preferably a focused heat source having a focal point 105 on the drum 102, i.e., the continuous surface of the drum, heats the powder to a temperature sufficient to fuse the powder. The powder may be fused by partially liquefying the powder or by fully liquefying the powder which then cools back to a solid at the roller temperature once the energy source 104 is removed. A sintered image 112A is formed by moving the heat source 104 relative to the continuous surface of the drum 102 to trace lines or regions of sintered powder across the layer of sinterable powder 110. In the preferred embodiment, the cross sectional layer of the object may take on any complex configuration by rotating 120 the drum 102 and translating 122 the heat source 104 under the control of the microprocessor. Unsintered powder continues to adhere to the drum 102 in this illustrative example.

As illustrated in FIG. 1B, the sintered image—illustrated in the form of a diamond 112A—is then transferred to the work surface 106 by simultaneously rotating 124 the drum 102 while translating 126 the drum across the work surface. As the drum 102 advances across the work surface 106 from its initial position illustrated by dashed lines, the sintered image 112A detaches from the drum and transfers to the work surface. The sintered image and the portion of the object receiving the sintered image, in some embodiments, are exposed to a heat source for transfixing the sintered image to the object being assembled. A transfixing heater, such as a fuser lamp (discussed in more detail below), increases the tackiness of the sintered image and the work surface for purposes of enhancing the layer-to-layer fusion or welding and ensuring that the sintered image has a greater adhesion to the work surface than the drum 102. The distance between the translated drum surface 102 and the work surface 106 is approximately equal to or less than the thickness of the sintered image 112A. As stated above, the term work surface 106 as used herein refers to a surface on which the current sintered image is deposited, which may be the platform of the 3DP 100 or a previous sintered image layer laid down during the assembly of the 3D object.

In the preferred embodiment, the sintered image is concurrently transferred to and fused with the object being assembled. In some embodiments, however, the sintered image may first be deposited onto the object and subsequently fused by, for example, a fuser lamp that follows the drum, a bulk heating process, a hot pad (discussed in more detail below), or a combination thereof.

As illustrated in FIG. 1C, the entire sintered image is deposited onto the work surface 106 once the drum 102 has traversed the length of the work surface and the drum reached its final position illustrated by dashed lines. Unsintered powder, left over after the sintered image is formed, may be removed from the drum 102 before or after transferring the sintered image to the object, removed from the work surface 106 after transferring, or retained at the work surface after transfer to provide support for the subsequent sintered image, particularly overhanging sections of the next sintered layer deposited onto the object 112B. This process of producing and depositing a sintered image is repeated for each cross section of the object being constructed from the model.

Figure 2:
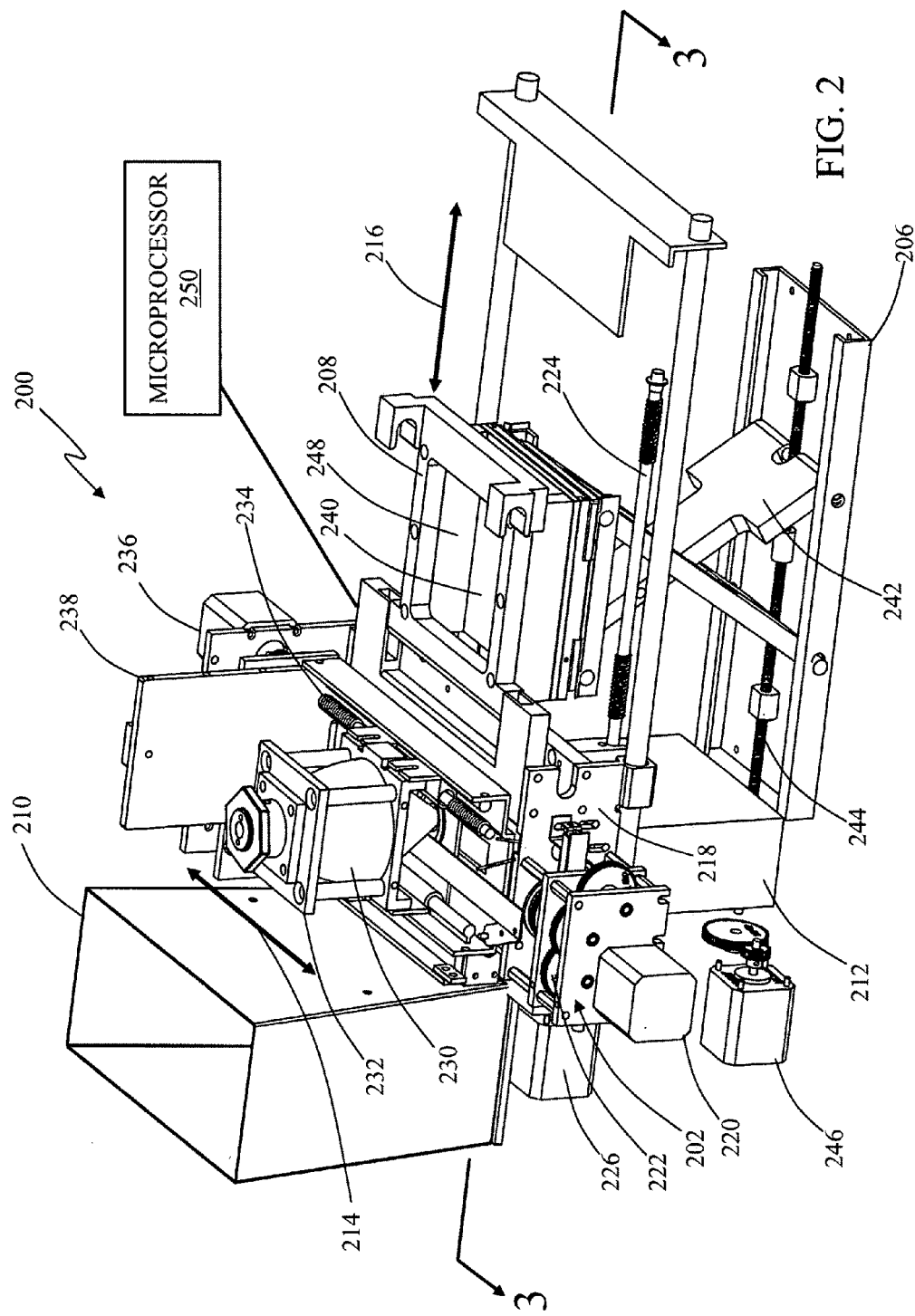
FIG. 2 is an isometric view of the three dimensional printer in accordance with the second preferred embodiment of the present invention.
Figure 3:
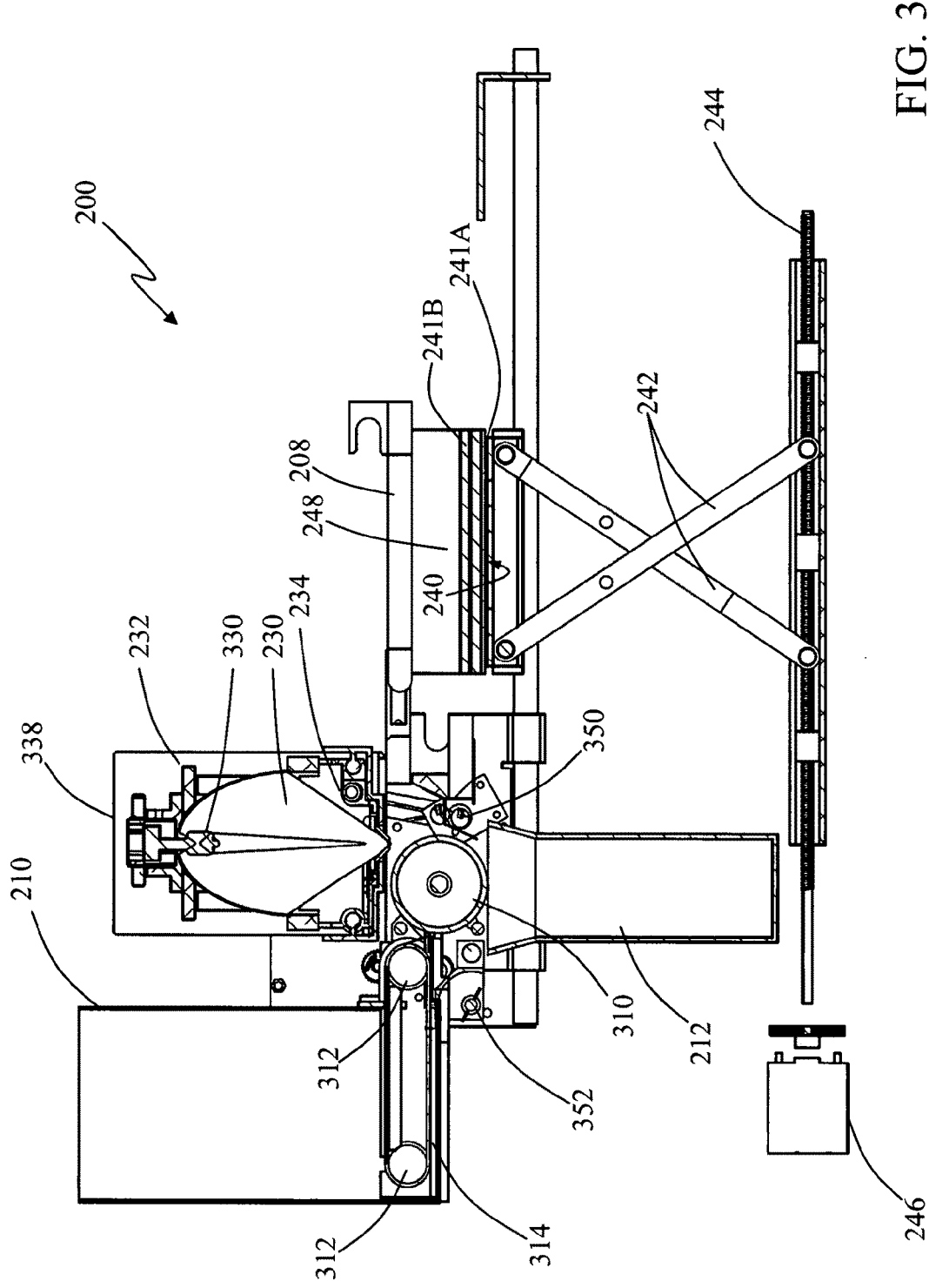
FIG. 3 is a cross sectional view of the three dimensional printer in accordance with the second preferred embodiment of the present invention.

Illustrated in FIGS. 2 and 3 is a 3DP 200 in accordance with the second preferred embodiment of the invention. Consistent with the first embodiment, the second embodiment includes a drum assembly 202, a sintering assembly, a platform assembly, and a microprocessor 250. This embodiment of the 3DP 200 further includes a sinterable powder applicator 210, a sinterable powder reservoir 212, an object heating element 208, and means for cleaning the roller and work surface in preparation for the next sintered image. The drum assembly 202 includes a drum frame 218 and a process drum 310 adapted to rotate in response to a first actuator, preferably a stepper motor 220, operably coupled to the drum via one or more reduction gears 222.

Figure 4:
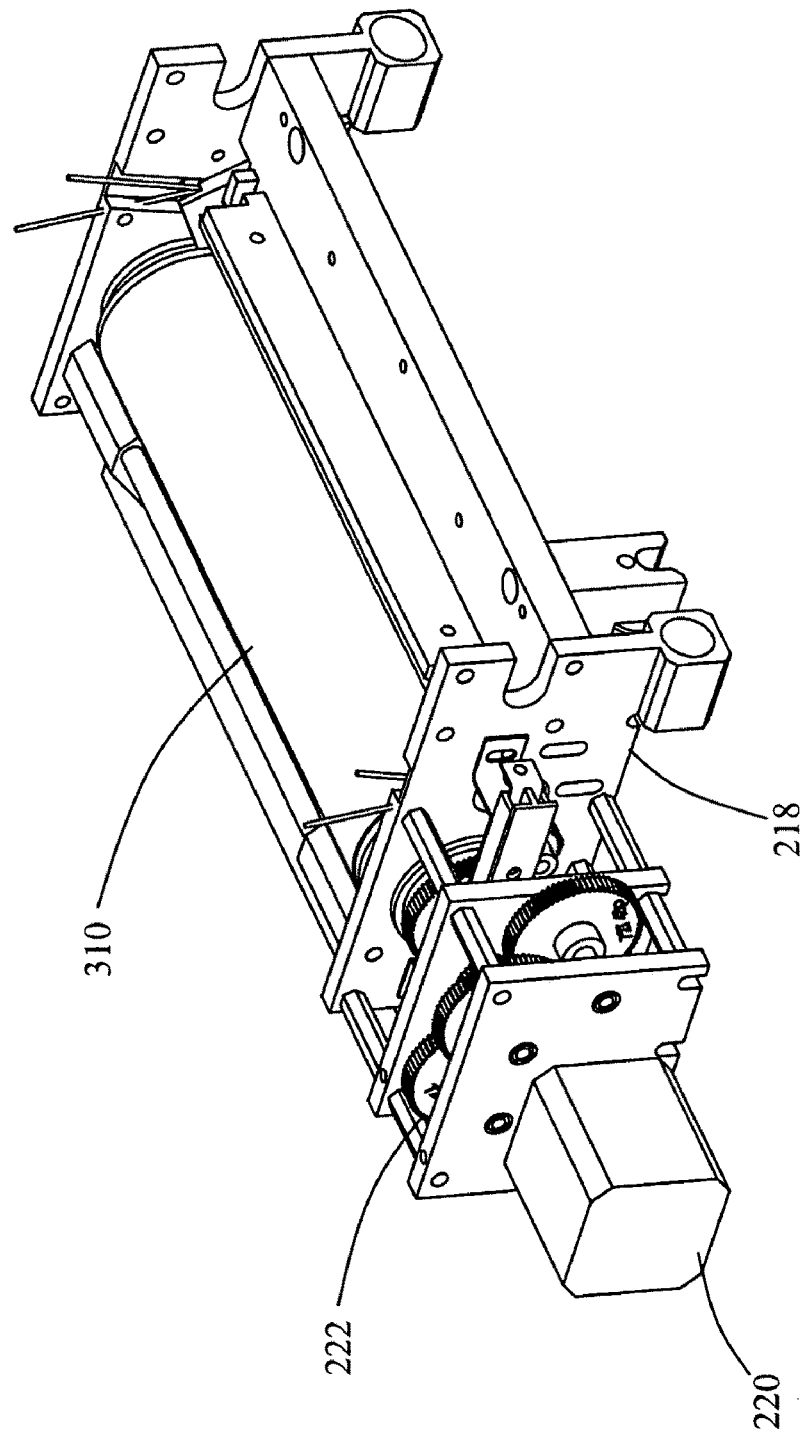
FIG. 4 is an isometric view of the drum assembly in accordance with the second preferred embodiment of the present invention.

The drum assembly in this embodiment, also illustrated in FIG. 4, further includes a second actuator, preferably a stepper motor 226, to drive the drum 310 laterally across the length of the work surface (direction perpendicular to the longitudinal axis of the drum 310) preferably via a lead screw 224. The drum 310 is preferably a smooth anodized aluminum drum onto which the sinterable powder is applied. An anodized aluminum drum provides thermal stability and durability although other thermally conductive and non-conductive materials may also be used. In the preferred embodiment, the circumference of the drum 310 is equal to or greater than the length (direction perpendicular to drum axis) of object being constructed. In other embodiments, however, the drum may have a circumference smaller than the length of the working surface if the steps of applying the powder, imaging the powder, and depositing the sintered image are performed substantially concurrently as part of a continuous process. The outer surface of the drum 310 may be coated with a nonstick surface such as TEFLON, for example, to inhibit the sintered image or the unsintered powder from unduly adhering to the drum 310, to minimize heat loss into the drum during imaging, or to enable an electric field to be employed to aid powder adhesion.

The drum assembly may also include a temperature regulator (not shown) and drum heating element—preferably a tubular halogen lamp or cartridge heater 802, for example, (see FIG. 8A) mounted internal to the drum 310—adapted to heat the drum 310 to a temperature substantially near, but lower than, the fusing point of the sinterable powder. In the preferred embodiment, the sinterable powder is a crystalline nylon powder and the temperature to which the outer surface of the drum is raised is between approximately 2 degrees Celsius and 15 degrees Celsius below the powder's melting point. A higher roller temperature is generally employed to facilitate relatively rapid sintering of the powder with minimal input energy from the imaging lamp system, although the 3DP system may be more susceptible to roller temperature variations and powder temperature variations that can result in unintentional sintering of powder on the roller. In contrast, the drum may be held at a lower temperature to improve sintered image quality, although the sintering process and overall object production may take longer. In some embodiments, the drum assembly further includes a transfixing heater 804 (see FIG. 8A) for heating the outer side of the sintered image immediately before the sintered image is deposited on the preceding sintered image of the object. Similarly, in some embodiments the heating element may also heat the top surface of the previously deposited sintered image of the object being formed. The transfixing heater 804—such as a halogen lamp, tungsten wire heater, or nichrome wire heater, for example—may be mounted on the assembly housing the drum 310 in proximity to the drum and the platform assembly or work surface. In order to control the amount of heat applied to the surfaces to be adhered, the transfixing heater is preferably further includes an adjustable mask to limit the area of exposure for each surface.

Figure 5:
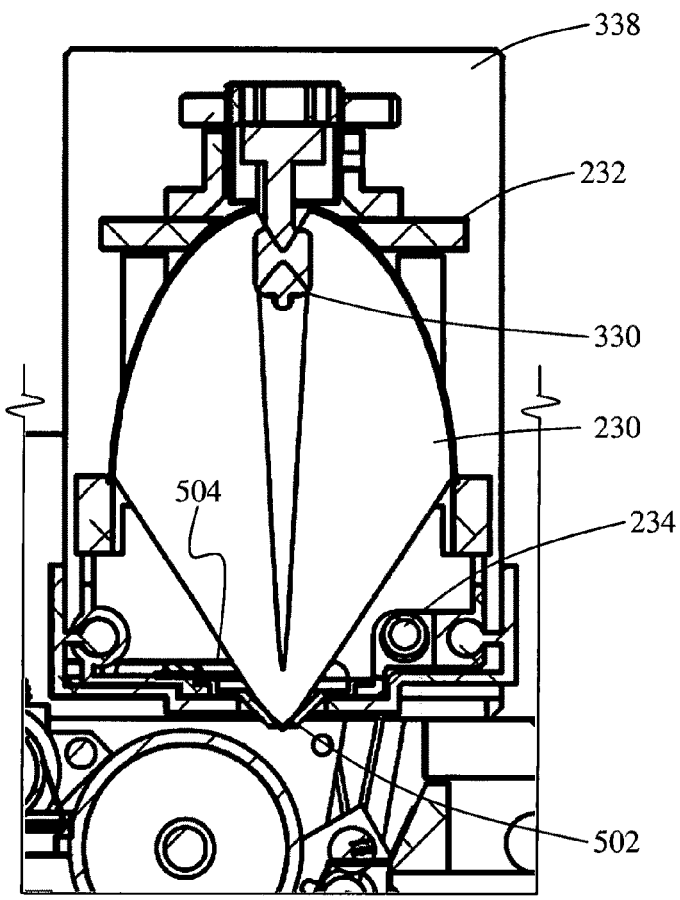
FIG. 5 is a cross sectional view of the sintering assembly in accordance with the second preferred embodiment of the present invention.

The sintering assembly in the second preferred embodiment, also illustrated in FIG. 5, includes a housing 232 and frame 338 supporting an incoherent energy source 330 whose energy is focused on or in proximity to the drum 310 via a reflector 230 or lens to provide a small area of concentrated heat. The heat source 330 is preferably a halogen lamp with an axial filament whose long axis coincides with the focal axis of symmetry. The halogen lamp is available from Sylvania of Danvers, Mass., although any of a number of other heat sources may be used including tungsten bulbs and arc lamps. As illustrated in the cross sectional view of FIG. 3, the reflector 230 possesses a substantially elliptical cross section for purposes of optimizing the concentration of energy from the heat source 330. A suitable reflector 230 is available from Melles Griot of Carlsbad, Calif., part #02 REM 001. In some embodiments, the sintering assembly further includes a mask 502 with an adjustable aperture or plurality of selectable apertures for further controlling the spot size of the focal point which may be varied between approximately 10 and 200 mils in the second preferred embodiment. The design of the mask 502 may also include a parabolic surface of revolution, for example, a Winston cone, that further concentrates the energy from the heat source 330 to produce a smaller spot, thus minimizing the power consumption and obviating the need—in this embodiment—for a laser energy source. In some embodiments, the sintering assembly further includes a shutter 504 interposed between the heat source 330 and drum 310 for effectively interrupting the energy beam. In embodiments where the aperture size can be selected and dynamically changed, the rate at which the heat source moves across the powder can be varied during construction of a sintered image or object to compensate for the changes in power incident at the focus. The heat source 330 is preferably adapted to move co-parallel relative to the axis of the drum 310 by means of an actuator, e.g., a stepper motor 236, and a lead screw 234.

In some alternative embodiments, the sintering assembly employs a laser or laser diode matched to an absorption band of the sinterable powder layer as a heat source. The sintering assembly may further include a steerable or rotating mirror in a fixed position that is adapted to aim the laser heat on the drum 310, thereby obviating the need to sweep the sintering assembly over the drum 310 and reducing the number of high precision actuators.

The platform assembly in the second preferred embodiment includes a horizontal build surface on which the first sintered layer is deposited and the complete object assembled. In the preferred embodiment, the build surface 240 incorporates a heating pad 241A (discussed below) into the build surface on which the object is constructed from printed sintered images. The height of the build surface 240 is adjusted relative to the drum 310 by means of a scissor lift 206 including two cross arms 242, a lead screw 244 with left handed and right handed threads on either end, and an actuator, preferably a stepper motor 246. Rotation of the lead screw 244 causes the two cross arms 242 to rotate toward or away from each other depending on the direction of rotation, thereby enabling the build surface 240 to ascend or descend, respectively. In some embodiments, the build surface 240 is adapted to rotate in the horizontal plane with respect to the scissor lift 206, thereby allowing the build surface 240 to be rotated to a random angle preceding the deposition of each sintered image to prevent the accumulation of repetitive errors or artifacts which, if uncorrected, may result in vertical non-uniformities or nonlinearities in the assembled object. One skilled in the art will appreciate that the orientation of the sintered image produced on the drum 310 should reflect the same angular rotation as the build surface 240.

For each sintered image deposited, the height of the build surface 240 relative to the drum 310 is adjusted such that the top of the object being constructed is lower than the drum 310 by a distance substantially equal to the thickness of a sintered image applied to the object. In this embodiment, the platform is lowered after each image is applied to the object, but, in another embodiment the height of the drum could be adjusted upward to compensate for the thickness of the object as the object is assembled. In some embodiments, the build surface 240 is the bottom of a object build vat having side walls (not shown) that contain both the object and the unsintered powder remaining after printing of sintered images, thereby providing a foundational support for portions of subsequent sintered images that have no object immediately below them.

The actuation of the stepper motors employed in the drum assembly, the sinter assembly, and the platform assembly are preferably cooperatively controlled by the microprocessor 250 adapted to concurrently rotate the drum 310 and translate the sinter assembly to deposit each of the plurality of cross-sections from which the object is constructed.

Figure 6:
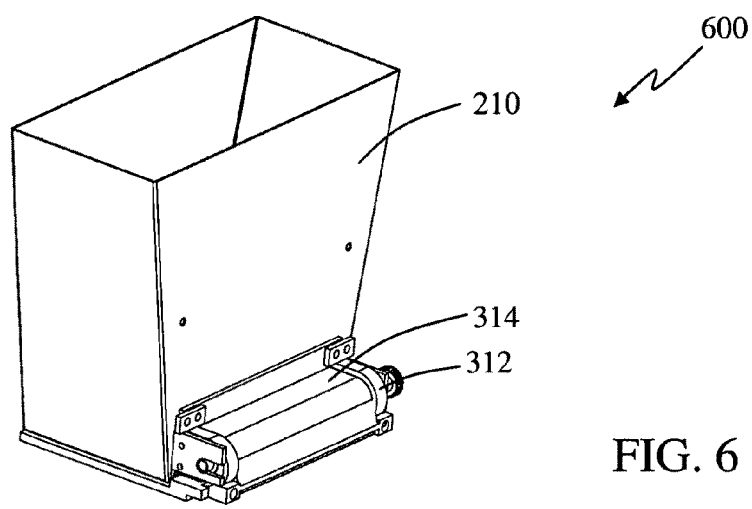
FIG. 6 is an isometric view of the powder applicator in accordance with the second preferred embodiment of the present invention.
Figure 7A:
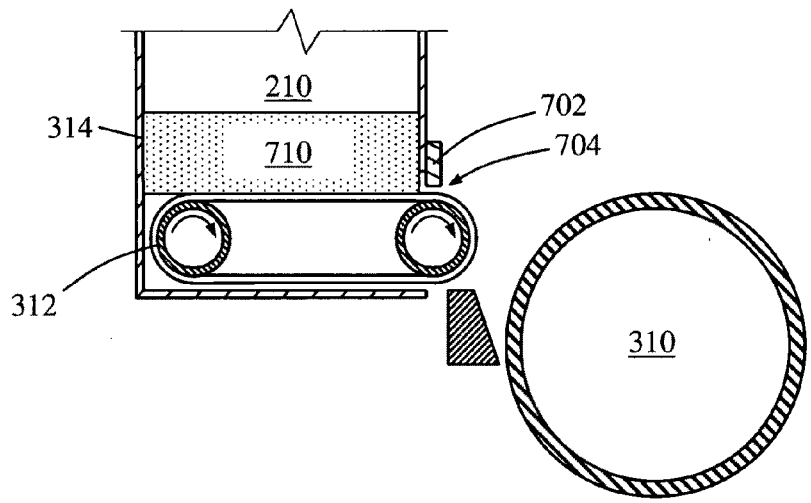
FIGS. 7A-7C are schematic diagrams demonstrating the operation of the powder applicator in accordance with the second preferred embodiment of the present invention.
Figure 7B:
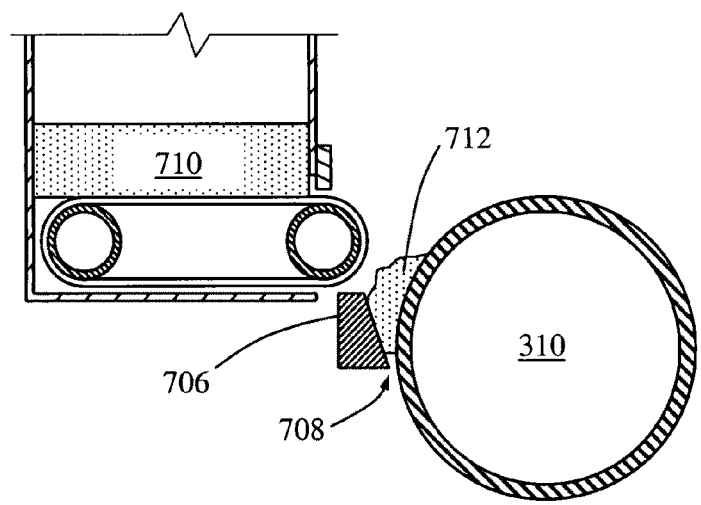
Figure 7C:
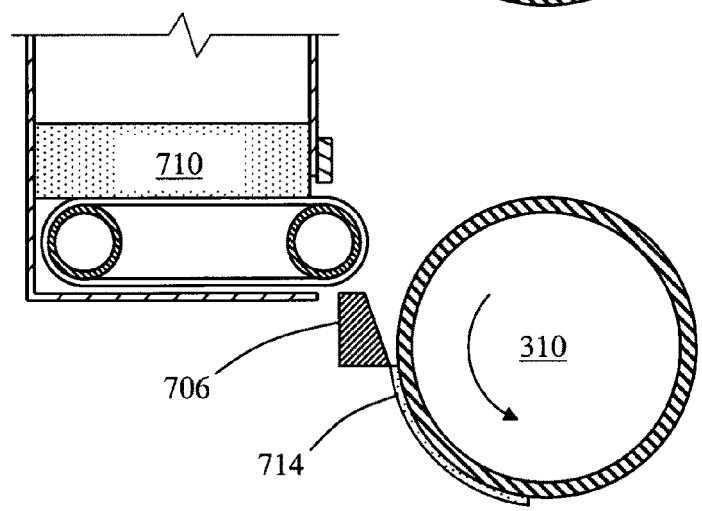

In some embodiments, the 3DP further includes a sinterable powder applicator to apply powder to the drum 310 and one or more sinterable powder reservoirs 212 used to collect unsintered powder recovered from the drum 310 and unsintered powder recovered from the work surface. Referring to FIGS. 2-3 and FIG. 6, the powder applicator 600 of this embodiment includes a sinterable powder bin 210 from which sinterable powder is dispensed and applied to the drum 310 using, for example, a powder conveyor belt 314 and pulleys 312. As demonstrated by the powder applicator schematics in FIGS. 7A-7C showing the formation of a sinterable powder layer, sinterable powder 710 is drawn from bin 210 as the pulleys 312 are turned and the belt 314 advanced. An agitator (not shown) in or attached to the bin 210 may be employed to enhance the transfer of powder. The volume of sinterable powder dispensed by the belt 314 is preferably precisely controlled by the adjustable gate 702 and the gap thereunder. As the powder falls off of the conveyor belt to the cavity above the applicator blade, the powder density is normalized to ensure uniform and repeatable density as the powder is applied to the drum regardless of how the powder was compacted in the powder bin. The dispensed powder 712 accumulates against the drum 310 and a layer control blade 706 used to regulate the thickness and uniformity of the powder applied to the drum 310. The cavity 708 created between the blade 706 and drum 310 is preferably wedge-shaped with a relatively wide upper gap to properly draw powder and a narrower lower gap to spread the powder uniformly across the width of the drum 310—and preferably compact the powder to the proper density—as the drum is turned. The thickness of the sintered layer produced is preferably between 5 and 20 mils thick depending on the vertical resolution of the object required. As discussed above, the resulting layer 714 of sinterable powder adheres to the drum 310 due to the inherent tackiness induced by the heating lamp 802 therein.

In the preferred embodiment, the sinterable powder is a crystalline plastic powder such as Nylon #12 having an average particle size of 60 microns although this is subject to variation depending on the 3D printing requirements and the manufacturing method, for example. In some embodiments, the sinterable powder includes a distribution of two or more particle sizes, namely a first set of relatively large particles and a second set of relatively small particles where the diameter of the smaller particles is selected to substantially fill the inter-particle voids present between the larger particles, thereby increasing the density of the sintered powder and reducing the shrinkage of the object.

The distribution of particle sizes, referred to herein as a modal distribution, may include a plurality of nominal particle size, each being successively smaller, to provide maximal powder density.

In the alternative to Nylon #12, various other sinterable materials may also be employed including Nylon #11, Acrylate Butadiene Styrene (ABS), Polystyrene and other powders with a similar particle size. The sinterable powder may further include a radiation absorbent agent or dye that increases the effective absorptivity, which is substantially symmetric to the emissivity, of the powder in the wavelength band of radiation emitted by the heat source. For example when the heat source is visible light black or grey coloring agents may be employed to increase the powder's energy absorption, thereby increasing the rate at which the powder may be sintered and the object assembled. The radiation absorbent agent may also allow lower power incoherent energy sources including lamps as well as coherent energy sources including laser and laser diodes to be used as a sintering radiation source. In other embodiments using a laser or laser diode, the dye may be absorptive primarily in the narrow emission band of the laser.

In some embodiments, the 3DP 200 is adapted to produce one or more sintered images from a sinterable powder including metal, for example. One exemplary product is distributed under the trade name METAL MATRIX PLASTIC by Hi-Temp Structures of Gardena, Calif.

In the second preferred embodiment illustrated in FIG. 3, the 3DP 200 further includes one or more object heating elements, preferably including a first heating pad 241A and a second heating pad 241B rotatably affixed to the platform assembly. The first heating pad 241A contacts the bottom side of the object under construction. The second heating pad 241B (discussed in more detail below) is generally placed in proximity to or in contact with the upper side of the object (not shown). Together or individually, the first heating pad 241A and a second heating pad 241B elevate the temperature of the object for purposes of enhancing the bond between the next sintered image and the object and reducing temperature gradients in the part, therefore inhibiting internal stresses that may induce dimensional inaccuracies in the object.

Figure 8A:
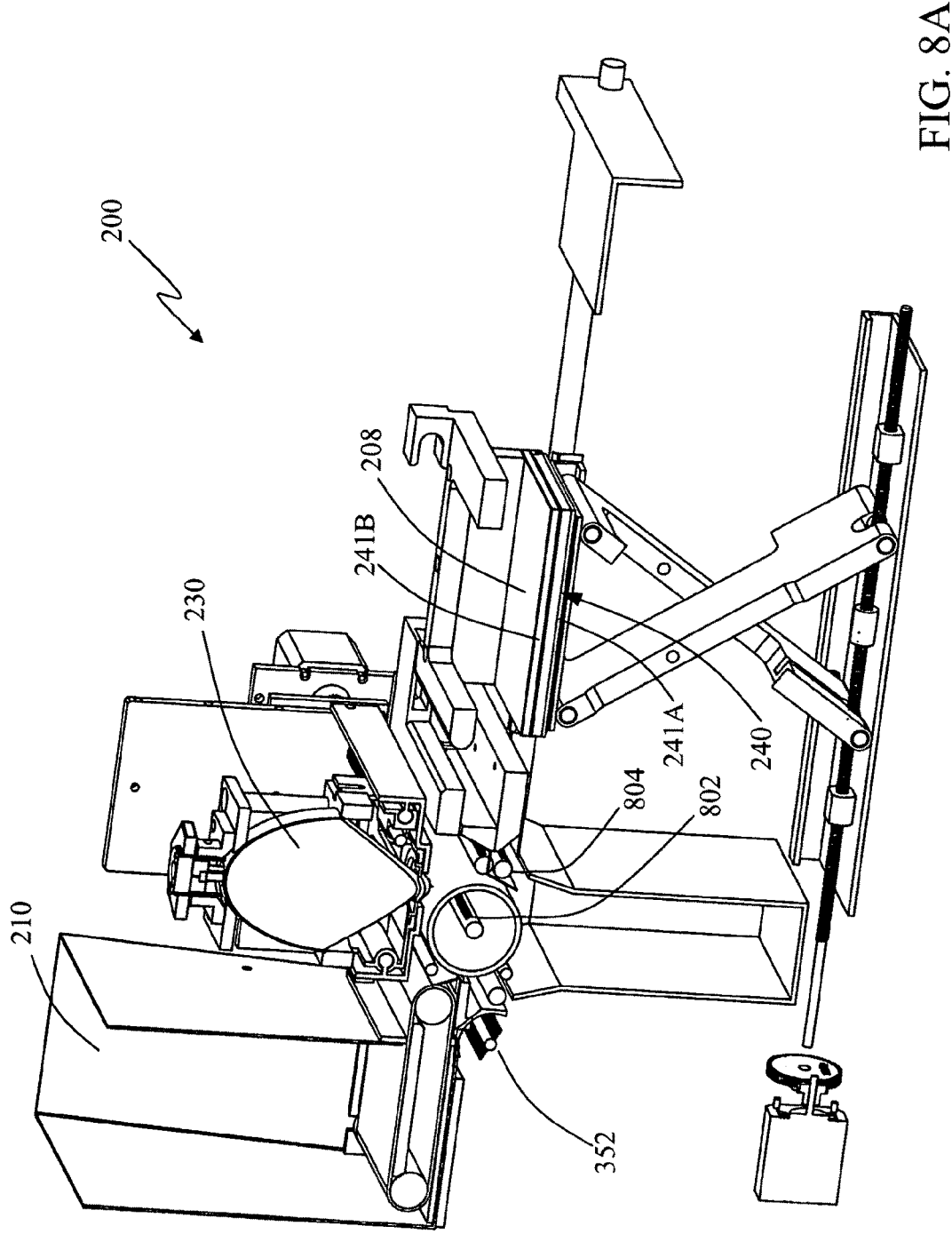
FIGS. 8A-8D are cross sectional isometric views demonstrating the three dimensional printer forming a sintered image and applying it to the object under construction in accordance with the second preferred embodiment of the present invention.

The mechanical operations by which the 3DP 200 forms a sintered image and applies it to the object under construction is illustrated in FIGS. 8A-8D which are cross-sectional views drawn in perspective. Referring to FIG. 8A, sinterable powder sufficient for a single sintered layer is dispensed in bulk to the drum 310 which resides in its home position in proximity to the bin 210. The drum 310 is rotated and the newly applied sinterable powder is formed into a layer as the drum is turned. The cartridge heater 802 and transfixing heater 804 are clearly visible in the several views of FIGS. 8A-8D.

Figure 8B:
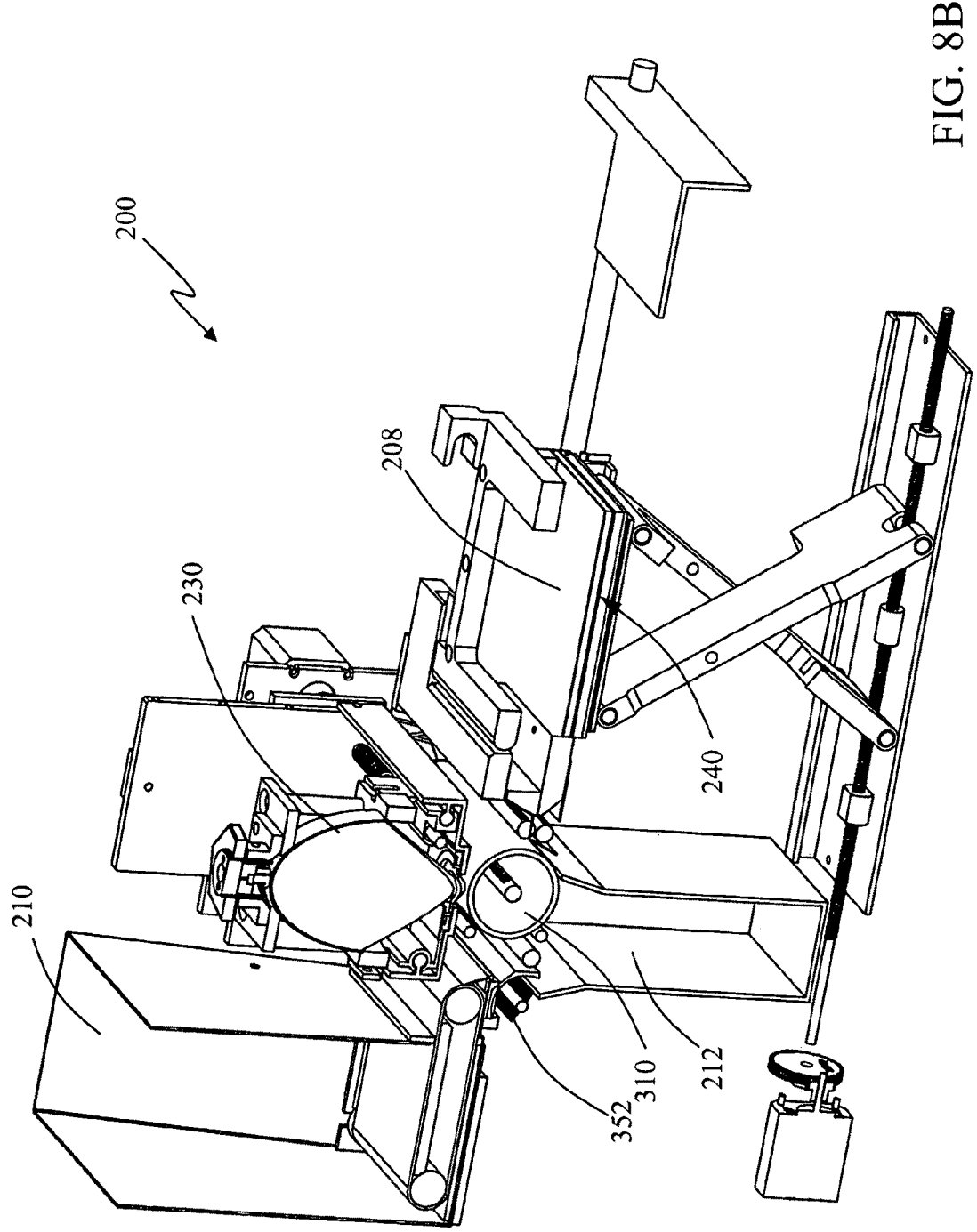

The Referring to FIG. 8B, the drum 310 in this embodiment advances to a position coinciding with the focal point of the lamp assembly and portions of the powder layer are sintered to form one or more solid portions reflective of the associated model cross section. The focal spot may be swept over the drum surface in accordance with a raster pattern or in accordance with model vector data, for example, depending on the digital format of the model cross sectional data. In the preferred embodiment, a raster sequence and patterns are used to minimize internal stresses within an imaged layer.

Figure 8C:
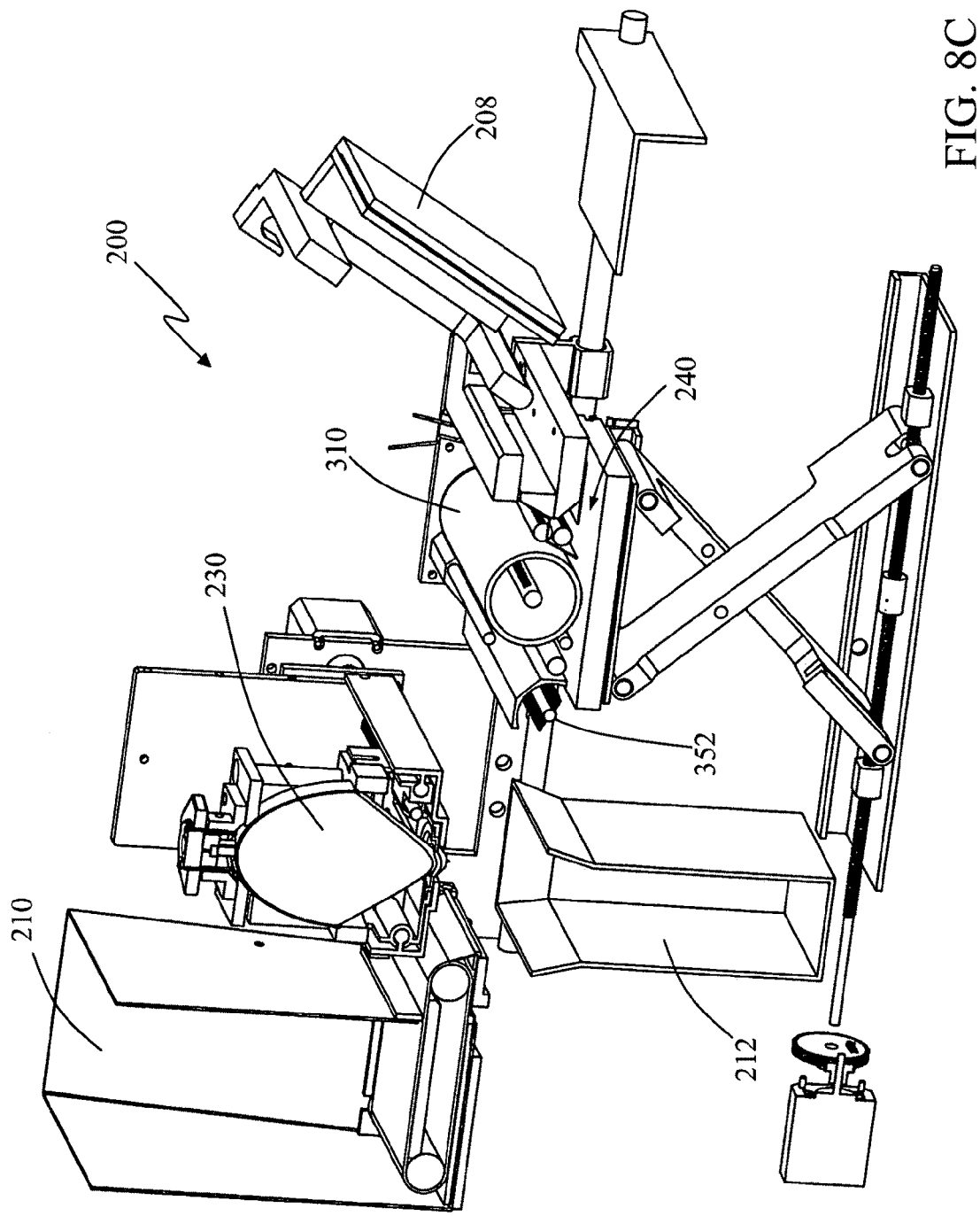

Referring to FIG. 8C, the drum 310 with the sintered image is rotated while being driven to the right in this illustration moving it over the top of the platform. The gap between the drum 310 and the work surface is less than or equal to the thickness of the sintered image—preferably substantially equal to the thickness of the sintered image—and the drum rotated such that the sintered image being deposited on the work surface is stationary with respect to the work surface to prevent slippage or displacement of the object under construction. When the gap between the drum 310 and the work surface is less than the thickness of the sintered image, the pressure exerted on the sintered image may improve the fusion between the image and object as well as increase the density of the object.

In some embodiments, the 3DP 200 further includes a layer thickness control processor, which may be embodied in the microprocessor 250 or a separate processor, that dynamically controls the thickness of the object being constructed as the sintered image is applied to the object. The layer thickness control processor preferably detects the thickness of the entire object or one or more sintered images as the object is being built and, using feedback, changes the thickness of the sinterable powder applied to the drum 310 or alters the pressure used to weld a sintered image to the object. The pressure may be controlled, for example, by altering the interference gap between the drum 310 and work surface so that translation of the drum across the work surface induces pressure that enhances the weld between the sintered image and object. In other embodiments, the layer thickness control processor controls the time and temperature of the pressure applied between the drum and object to achieve the desired layer density and to ensure bonding. In particular, the layer thickness control processor is adapted to vary the speed and temperature with which the drum 310 is translated across the work surface between image layers to normalize the image thickness and provide optimal bond quality. The transfixing heater 804 is preferably enabled as the drum 310 traverses the length of the work surface.

Figure 8D:
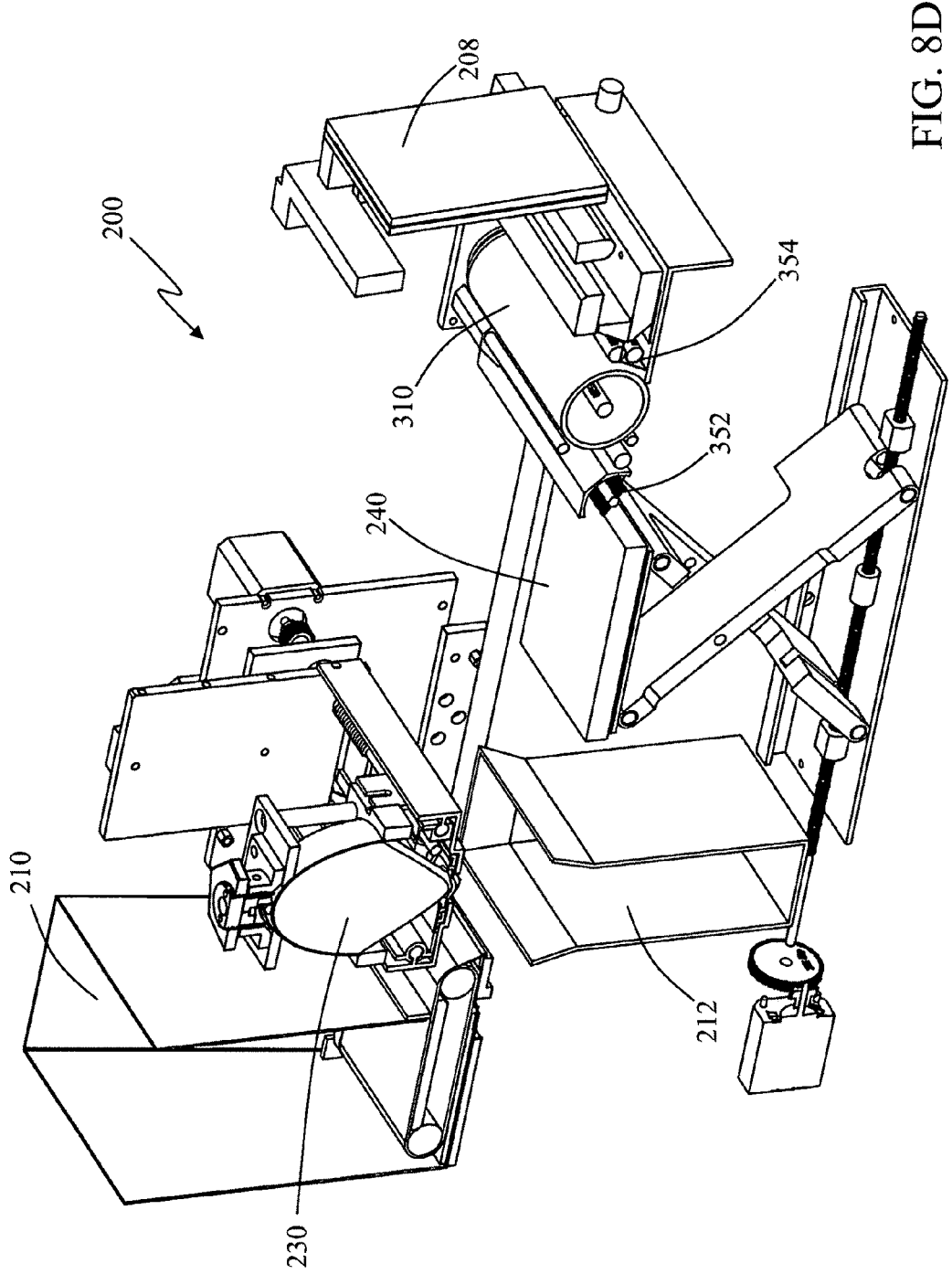

At the distended drum position to the right of the platform illustrated in FIG. 8D, a scraper 354 or brush, for example, is placed in contact with the drum 310 while the drum is turned against the scraper to remove any remaining powder or debris. The angle between the scraper 354 and the drum 310 is preferably between 0 and 45 degrees and the rate at which the drum is turned is preferably between 10 and 100 inches per minute. In some embodiments, the 3DP 200 further includes a powder reservoir (not shown) to collect the powder or debris removed by the scraper 354. In the alternative, an electric field and corona wire with a high potential difference with respect to the drum 310 may also be used to remove excess powder from the drum.

The drum 310 is returned to its home position, the work surface cleaned to remove excess unsintered powder, the build platform lowered by the scissor lift 206 to compensate for the thickness of the newly applied sintered image, the heating pad reapplied to the object under construction, and the process described above repeated until the object is completed. In the second preferred embodiment, the means for cleaning or otherwise preparing the work surface includes a retractable rotary brush 352 incorporated into the drum assembly so that it may track the drum 310 as it traverses the work surface. In the preferred embodiment, the brush 352 is distended below the drum 310 before returning to its home position to left in the example illustrations of FIGS. 8A-8D, and a cylindrical brush head makes contact with the object and rotates clockwise to clear away loose powder from the work surface or to level the unsintered powder to the level of the newly deposited sintered image. The retractable rotary brush 352 assumes a retracted configuration as the drum passes left to right, as illustrated, depositing a sintered image so as to avoid disturbing the newly deposited image before it has cooled sufficiently.

In some other embodiments, the material removal mechanism for cleaning the work surface includes a vacuum, a conductor for drawing powder off the work surface using electrostatic attraction, a non-retractable brush, a blower for providing high velocity air, or a combination thereof. A non-retractable brush connected to the drum 310 may have a brush head, for example, adapted to maintain an interference with the work surface in order to sweep the work surface immediately after the image is transferred. In still other embodiments, the 3D printer further includes object cooling means for directing air, for example over the object to accelerate the rate at which a newly deposited sintered image is cooled, thereby allowing the object to be cleaned by a brush 352 immediately before and after the image is deposited, i.e., as the drum 310 traverses the work surface to the left and to the right.

As discussed above, the 3DP 200 in some embodiments includes a second heating pad 241B and corresponding support frame 208 rotatably attached to the drum assembly. The second heating pad 241B, also referred to as a "hot pad," is adapted to elevate and or maintain the temperature of the upper side of the object until the next sintered image is applied. As shown in FIGS. 8D and 8A, the pad 241B and frame 208 rotate up to provide clearance for the drum 310 as an image is deposited onto the object and then rotate back down to a point where it is in contact with the object as the drum 310 returns to its home position and the work surface is cleaned of unsintered powder. When in contact with the object, the second heating pad 241B raises the upper surface of the object to within several degrees of its melting point. This serves to reduce the amount of energy that must be added to weld the next sintered image to the object, to enhance the bond between the next sintered image and the object, and to preserve the dimensional uniformity of the upper surface of the object which is prone to dimensional distortion from internal stresses caused by temperature gradients.

In some embodiments, the second heating pad 241B also cooperates with a pressure sensing mechanism (not shown) and the layer thickness control processor (discussed above) to apply a determined heat and pressure to the top of the previously formed object with the deposition of each layer during the three dimensional printing process. The thickness of the newly deposited sintered image may be reduced by raising the build surface 240 on which the object is constructed to compress the top layer of the object against the second heating pad 241B with a determined force. The object is generally held against the second heating pad 241B during the formation of the next layer, which is enough time for the curl forces to relax and or the layer thickness adjusted. As one skilled in the art will appreciate, the pressure sensing mechanism may also be used to dynamically control the drum to object gap, that is, the pressure sensing mechanism is used to determined the actual height of the object and therefore the distance that the build platform must be lowered to achieve the optimum gap before application of the next sintered layer.

Figure 12:
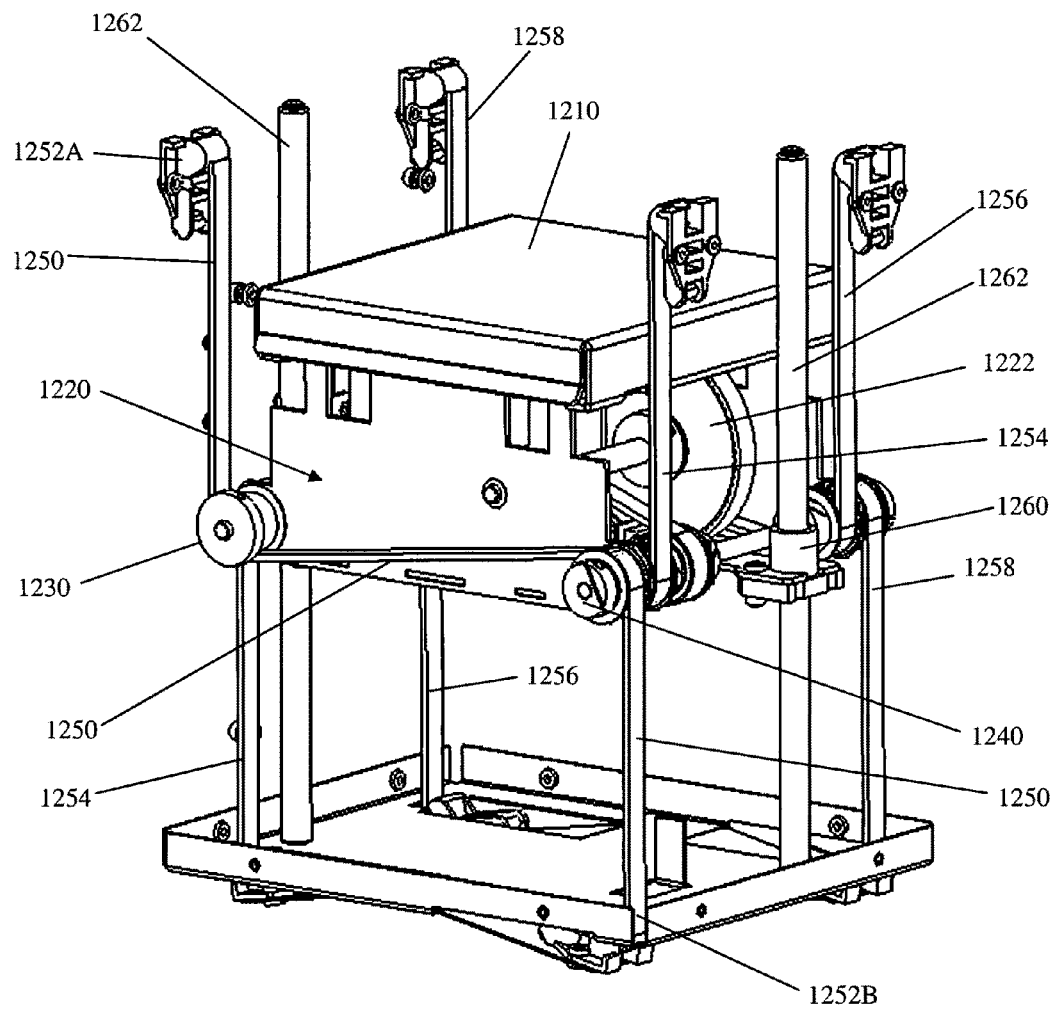
FIG. 12 is a z-stage control for regulating the thickness of an object during assembly, in accordance with an embodiment of the present invention.

Instead of the scissor lift 206, the platform assembly in another embodiment shown in FIG. 12 includes a horizontal build surface 1210 mounted to a lift 1220 that generally translates downward as the object is assembled on the build surface. The lift is a linear motion system including a high-torque stepper motor or other actuator, a drive system including one or more belts and pulleys, and processor for determining the proper force to apply between the build platform and the roller during layer transfer. The height of the build surface 1210 is adjusted downward relative to the drum 310 as one or more pulleys traverse one or more belts under the power of a stepper motor (not shown) and step down gear 1222. The set of pulleys includes a first pulley 1230 and a second pulley 1240 which engage a belt 1250 that is held in dynamic tension between its two attachment points 1252A, 1252B. When one or more of the pulleys 1230, 1240 are made to rotate, the first pulley 1230 crawls along the belt 1240 away from the upper attachment point 1252A while the second pulley 1240 crawls along the belt 1250 toward the lower attachment point 1252B. The pulleys 1230, 1240 and belt 1250—in combination with additional pulleys and belts 1254, 1256, 1258—cooperate to support the four corners of the build surface 1210 and apply a uniform force in the vertical direction as the platform ascends and descends. The path traversed by the platform is further constrained by the guides 1260 (including linear ball bearings) and hardened steel shafts 1262. As can be seen, the build platform 1210 can also be raised by merely reversing the direction that the pulleys 1230, 1240 rotate. The preferred embodiment further includes variable-current control circuitry, such as a chopper drive, for each of the motor coils to vary the upward or downward force applied by the lift. One or more optical encoders (not shown) may be used to sense the vertical position of the build surface 1210 for purposes of calculating any change in the force needed.

For each sintered image deposited, the height of the build surface 240 relative to the drum 310 is adjusted such that the top of the object being constructed is lower than the drum 310 by a distance substantially equal to the thickness of a sintered image applied to the object. In this embodiment, the precise height of the build surface 1210 is dynamically changed as the sintered image is deposited on the object in order to achieve a pressure sufficient to laminate the image layer to the part without squishing the image out from under the drum. The pressure, force per unit area of image, is made substantially uniform across the entire surface of an image being deposited on the object. The amount of force required to achieve the desired pressure is based on the geometry of the image, i.e., the area of direct contact between the drum and the part and/or support being pressed onto the object at any given instant in time. In general, the net force (neglecting friction) applied between the build surface 1210 and the drum is proportional to the width of the image. For example, the build surface 1210 is made to press the object against the image on the drum with twice the force where the width of the image is twice as large, thereby achieving a constant pressure across the two sections of the image.

In the preferred embodiment, an instantaneous force needed to achieve a predetermined pressure is computed for a plurality of segments of each image. The segments of the image correspond to strips spaced at a predetermined distance apart (e.g., 1 millimeter) in the direction of image roll-off. The lift 1220 is then driven upward (or downward) to achieve the necessary force when then roller coincides with the corresponding segment of the image. The force applied to the lift when the roller is between segments of the image is determined by linear interpolation, for example.

In the preferred embodiment, the requisite force between the object and image is applied by a stepper motor with an encoder mounted thereto. The encoder in the preferred embodiment has resolution sufficient to resolve three or more positions of the motor within a single step of the motor. An encoder configured to resolve 4000 "clicks" per revolution, for example, can resolve 80 positions per step of a motor having 50 4-step cycles per revolution.

The stepper motor is driven by two motor current signals provided to a pair of coils that are 90 degrees out of phase. The motor currents can be used to drive the motor to any angle within a cycle. When the motor currents correspond to an angle different from the motor's rotor angle, a resultant force is applied to the motor. The resultant force is generally proportional to the motor currents applied (i.e., more current produces more force). To drive the lift 1220 with the requisite force in the vertical direction, the motor currents are continually adjusted to specify a "driving angle" that is the sum of the actual rotor angle and a fixed offset in the direction the force is to be applied. The subsequent force exerted by the motor is then varied by varying the amount of current applied to the coils at the drive angle.

In some embodiments, the 3DP 200 includes a layer processing surface other than a processing drum 310 to form an individual sintered layer. The layer processing surface may be, for example, a planar surface on which the sintered layer is formed before being pressed or otherwise stamped onto the work surface on the platform assembly.

In some embodiments, the drum 310 and sinterable powder bin 210 are provided as a removable and replaceable unit to enable the user to easily remove and replace or repair the unit. The sinterable powder bin 210 is preferably a sealed or tamper resistant container analogous to toner cartridges.

In a third preferred embodiment of the 3DP, the object is constructed from sintered images that are sintered in the build vat in which the object is constructed. The 3DP may further include a second vat (not shown), namely a powder vat the supplies powder to the assembly vat to build the object. Both vats are also heated to a temperature just below the melting point of the powder to, for example, reduce the amount of energy needed to melt the powder.

The height of the work surface in the build vat is held substantially level with the height of the powder in the powder vat to facilitate the distribution of powder to the build vat. In the preferred embodiment, the build vat is made to descend and the powder vat made to ascend in proportion to one another. The height of each of the vats is preferably controlled by a separate scissor lift operably coupled to a microprocessor. A powder roller is used to move a layer of powder from the powder vat to the build vat and distribute it with uniform thickness and density. The powder layers deposited in the build vat are approximately 5-20 mils in thickness. In the third preferred embodiment, the roller is attached to the same sinter assembly to take advantage of the existing actuators, although it may also be mounted to a separate control mechanism.

The sinter assembly preferably includes an inexpensive incoherent energy source adapted to provide focused heat to sinter the uppermost layer of powder in the build vat. The heat source preferably includes an elliptical reflector and or a Winston cone. As with the second embodiment, the sinter assembly may further use a mask with a hole for controlling the spot size of the beam, and a shutter for interrupting the beam. An example spot size in this example is approximately 30-70 mils. In contrast to the second embodiment, the focal point coincides with the upper most layer of sinterable powder in the build vat and the sintered image created by sweeping the sinter assembly across the width and length of the build vat in accordance with the associated cross-sectional layer of the model.

Illustrated in FIGS. 9A-9E are cross sectional diagrams demonstrating the formation of an object using a partially sintered support structure. A partially sintered support structure as used herein refers to a laminar structure that is built of sinterable powder concurrently with the object being assembled to provide structural support, during assembly, for portions of the object that project or overhang with respect to the preceding layer of sintered powder. The partially sintered support structure may be used in the present invention and other rapid prototyping application where unimaged sinterable powder is removed from the work surface after the imaged layer is transferred to the previous layer of the object being assembled. A support structure generally comprises two portions including (1) a substantially rigid portion that is sintered with the same energy density as the object being assembled and (2) an interface portion sintered with less energy than the object to provide a detachable boundary between the rigid portion and object.

Referring to an exemplary structure and object, shown in cross section FIG. 9A, the support structure 900 being assembled comprises a plurality of layers 901-905 of sintered powder which may include one or more layers 901-902 deposited before the first layer of the object. The third sintered image layer 903 is produced with a substantially rigid portion 920 as well as an interface portion 930 in proximity to the first sintered image layer 951 of the object being assembled. The fourth sintered image layer 904 is produced with a substantially rigid portion 921 and an interface portion 931 adjacent to the first sintered image layer 951 of the object. The fifth sintered image layer 905 includes a substantially rigid portion 922, an interface portion 932 as well as the first sintered image layer 951 of the object. The base layers 901-902 and substantially rigid portion 920-922 are fused with the same energy per unit area per unit time as the object being assembled including the first sintered image layer 951.

The interface portions 930-932 are fused with the less energy per unit area per unit time than the layers of the object. In the preferred embodiment, the interface portions 930-932 are sintered by subjecting sinterable powder in the region of the interface to the radiant energy source for a shorter period of time than the regions of the object and rigid portions. The radiant energy source may be made to traverse the drum and draw, i.e., sinter, the region of the interface at a rate that is 40 to 100 percent faster than the regions associated with the object, for example, thereby making the interface portion weaker than the part and support structure. In general, the particles of sinterable powder associated with the interface portion are fused to a lesser degree than the particles of the object or rigid portion, thereby giving rise to a difference in density that makes the interface relatively weak structurally.

Referring to the cross section of FIG. 9B, the additional layers of the object and of the support structure 900 are concurrently imaged and transferred. The completed support structure 900 includes base layers 901-902, rigid portions 920-924, as well as interface portions 930-935. As illustrated, the rigid portions 920-924 and interface portions 930-935 are adapted to conform to the contours of the object being assembled, which is a sphere in the present example. In particular, the layers of the support structure 900 enable a layer of the object to be effectively transferred with little or no distortion even where the layer being transferred projects beyond or is cantilevered with respect to the preceding object layers, which is true of each of the object layers 951-956. Thereafter, the remaining layers 957-958 of the object are printed and transferred to the object being assembled (see FIG. 9C), the completed object 950 separated from the support structure 900 at a boundary defined by the interface portion 931-936 (see FIG. 9D), and the interface portion removed to reveal the completed object 950 (see FIG. 9E).

Figure 10A:
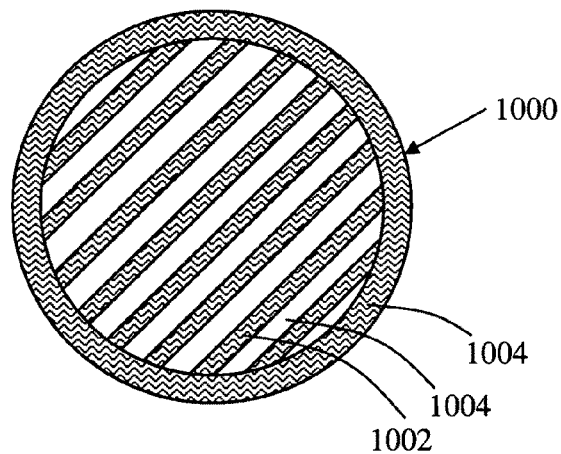
FIGS. 10A-10B are plan views of individual sintered images showing alternating open hatch patterns in accordance with an embodiment of the present invention.
Figure 10B:
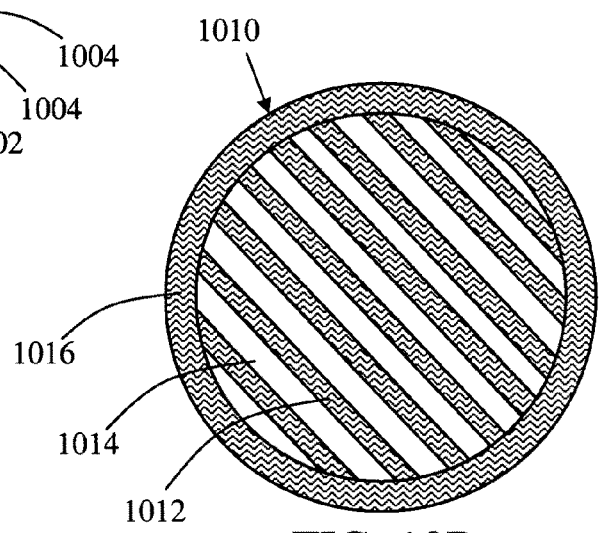
Figure 10C:
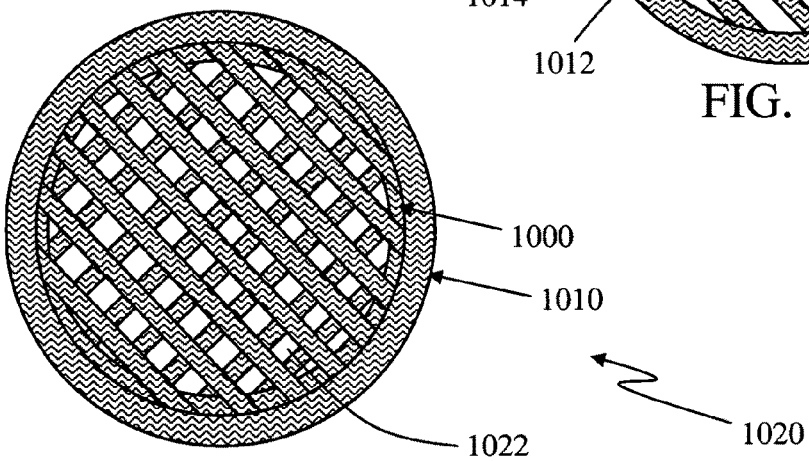
FIG. 10C is plan view of an object being assembled from a plurality of sintered images having alternating open hatch patterns in accordance with an embodiment of the present invention.

Referring to FIGS. 10A-10C, the object 950 of FIGS. 9A-9E may be constructed from layers having optimized border and fill patterns to increase the build speed, reduce internal stresses that lead to dimensional inaccuracies, and make the part less brittle, i.e., more durable. In particular, the region within the border 106 of the sintered image 1000 is generated from a plurality of parallel sections of rigidly fused sintered powder 1002 separated by sections of unsintered powder 1004. The succeeding sintered image 1010 may have a border 1016 and an open fill pattern including parallel sections of rigidly fused sintered powder 1012 and sections of unsintered powder 1014 having an orientation rotated by 90 degrees with respect to the preceding layer. In the preferred embodiment, each of the parallel sections of rigidly fused sintered powder 1002 forming the fill pattern are preferably generated by selecting an aperture for the heat source to produce the largest spot size possible that the particular area of the image being sintered will allow. This will significantly reduce the time required to produce the image and therefore the object. The width and spacing of the parallel sections of rigidly fused sintered powder 1002, 1012 and the width of the borders 1004, 1014, may be determined by the feature size and geometry. For example, a smaller feature may require a smaller spot size for the border and fill, while the border and fill of a larger feature may be generated with a larger spot size alone. Similarly, a smaller spot size may be used to generate a small object while a large spot size is used to generate a large object. The border and fill patterns may also be further optimized for speed, strength, cooling, or to produce vias 1022 that allow unsintered powder to be evacuated from the object being assembled 1020 or after the build is completed.

Figure 11A:
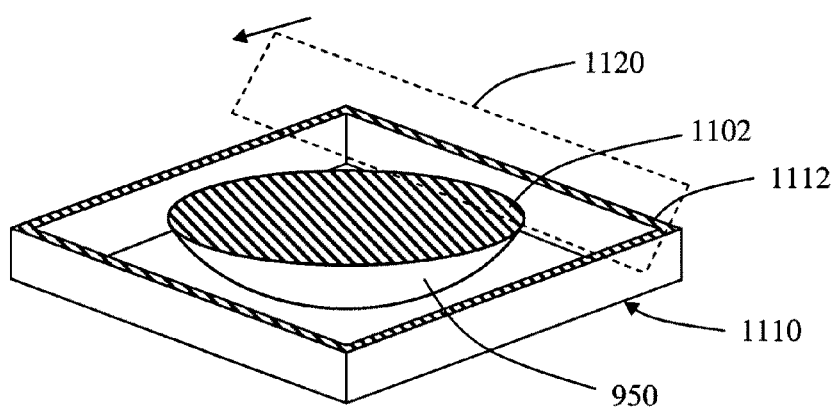
FIGS. 11A-11B are perspective views of an object being assembled within a layer thickness reference wall in accordance with an embodiment of the present invention.
Figure 11B:
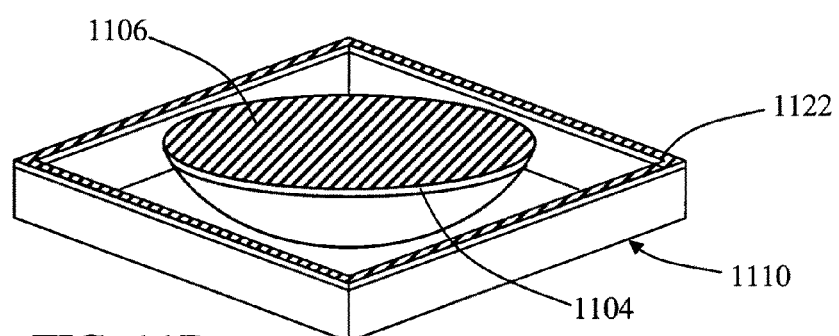

Illustrated in FIGS. 11A-11B is a layer thickness reference (LTR) wall 1110 used to accurately deposit and correct the height of the object being assembled. The wall 1110 is built layer by layer concurrently with the object 950 and is made from fully fused sintered powder. The height of the upper surface 1112, 1122 of the wall 1110 having a consistent geometry, is generally more uniform than the height of the object, which may become non-planar if minor errors in layer thickness are permitted to accumulate. The upper surface 1112 of the wall 1110 may therefore be used as a guide for a material removal mechanism, preferably a scraper blade 1120, also referred to as a doctor blade, that is passed across the object 950 to shave or otherwise remove high spots, thereby yielding a uniformly planar surface 1102 at a predetermined height. The subsequent sintered image 1104 and wall layer 1122 is then deposited and the scraper blade 1120 passed over the upper surface 1106 again to correct any non-uniformities. The process may be repeated for each layer of the object being assembled. Although the scraper blade 1120 requires as few as one or two sides of the wall 1110 parallel to the direction of travel, a wall that fully encircles the object being assemble further serves to retain unsintered powder for purposes of providing underlying support for subsequent sintered images.

Figure 13:
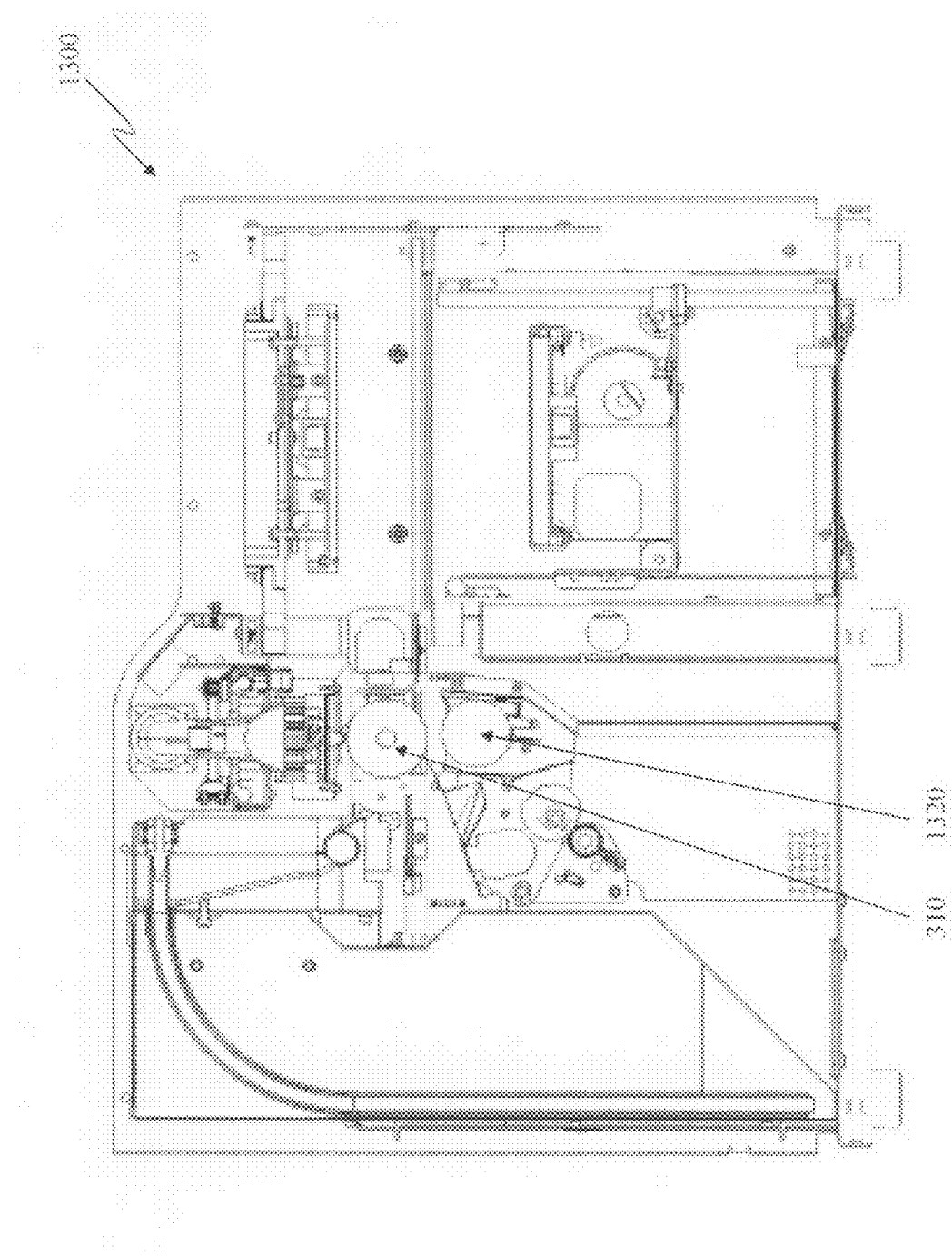
FIG. 13 is a side view of another embodiment of a three dimensional printer.

In some embodiments of the present invention, unsintered or partially sintered powder is removed from the drum using a brush, for example, before the sintered image is rolled onto the object being assembled. This may be necessary to prevent the unsintered powder, which is less dense than sintered powder, from the being applied to the object where it can build up at a relatively fast rate and interfere with the bonding of subsequent image layers. Referring to the side view in FIG. 13, the three dimensional printer 1300 employs the powder removal brush 1320 to remove all of the unimaged powder from the drum 310 after the powder is sintered into an image but before that image is rolled off from the drum, without removing any of the sintered image.

The powder removal brush 1320 must be able to withstand high temperatures and resist against wear. In the preferred embodiment, the powder removal brush 1320 includes carbon fiber bristles that are stiff enough to brush away the unimaged powder while soft enough to pass over the image without removing it from the drum. The diameter of the brush is about 1.75 inches with a twisted-wire core. The carbon fiber bristles are 0.00028 inches in diameter with an unsupported length of almost 0.875 inches, thereby making each bristle extremely flexible and able to bend as it contacts the drum.

To accomplish this brushing, the brush 1320 may be turned with respect to the drum 310, the drum turned with respect to the brush, or a combination thereof. In the preferred embodiment, the drum and the brush are both rotated so their relative tangential speed is greater than the speed of either the brush or the drum. The relative speed and the interference between the brush fibers and the drum may be adjusted to finely tune the amount of unimaged powder that is removed. In the preferred embodiment, the relative speed between the drum and brush is set to 18.5 inches per second. The interference between the bristles and the drum is set between 0.030 and 0.090 inches.

Figure 14A:
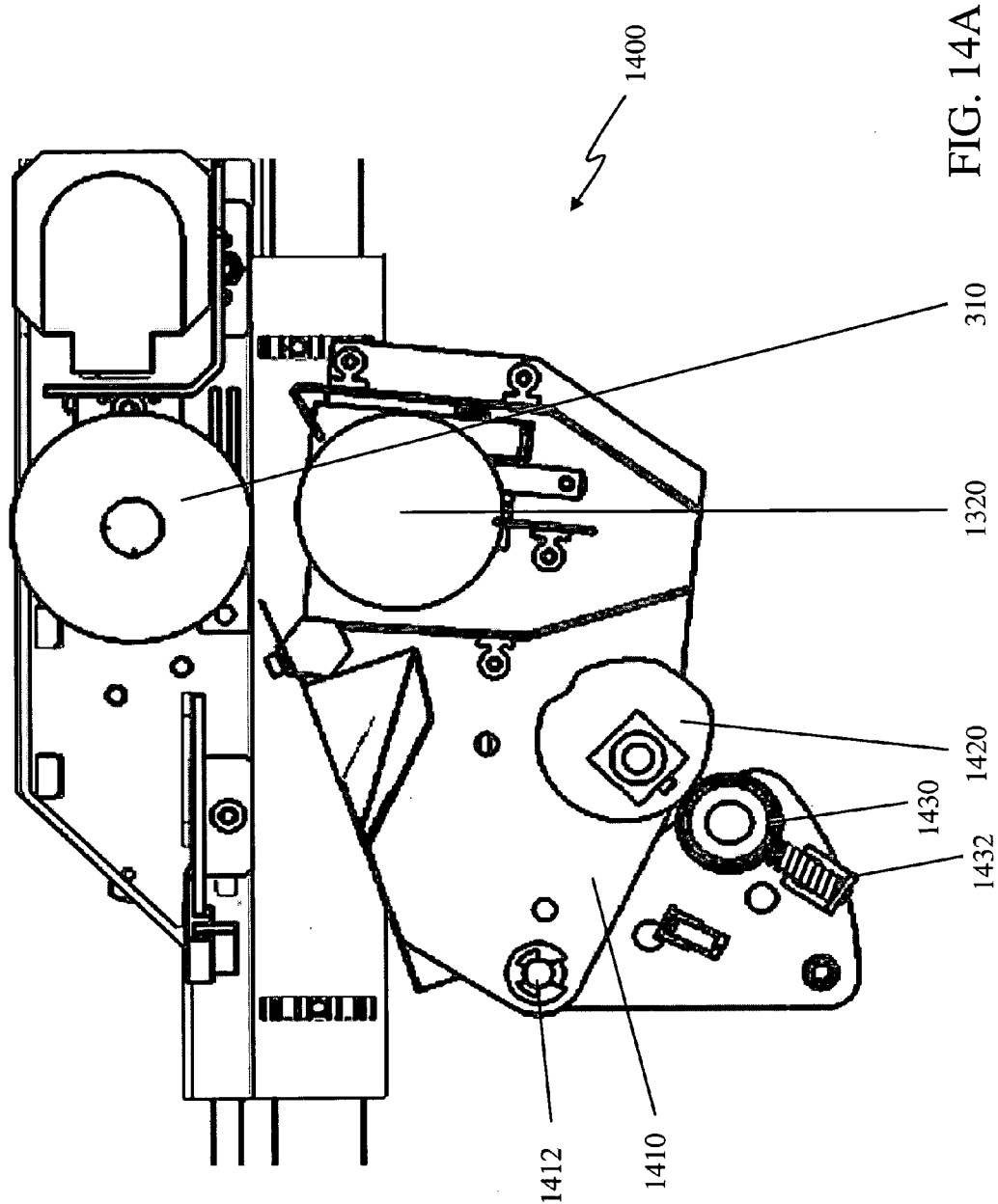
FIGS. 14A and 14B is a close-up of a brush used to remove powder from the drum before roll-off, in accordance with one embodiment of the present invention.
Figure 14B:
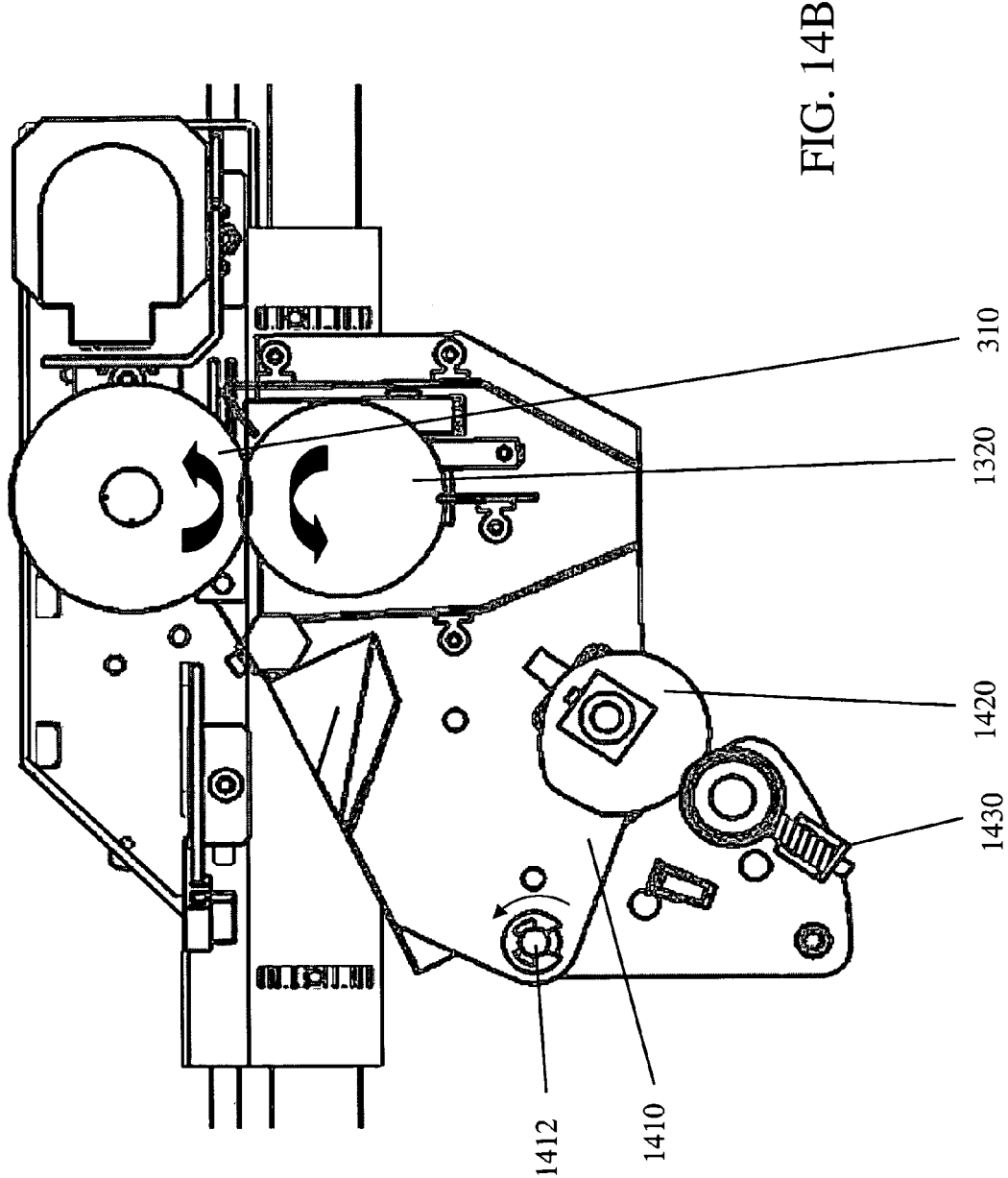

An exemplary mechanism 1400 for implementing brush before roll-off (BBR) is shown in FIGS. 14A and 14B. The BBR mechanism includes a frame 1410 in which the powder removal brush 1320 is mounted and a cam 1420 for driving the brush against the drum 310. Before the layer of powder on the drum is sintered, the cam 1420 resides in a position that holds the brush 1320 away from the drum (see FIG. 14A). After the image is sintered, the cam 1430 rotates about 180 degrees which pushes against a compliant support 1430 to rotate the frame 1410 about the pivot 1412 until the brush makes the proper interference with the drum (see FIG. 14B). The brush and/or drum may then be rotated to selectively remove any unsintered powder away from the sintered image on the drum. A threaded mount 1432 may be used to manually set or adjust the position of the compliant support, thereby controlling the amount of interference between the brush 1320 and drum 310. The BBR mechanism may further include one or more shields 1450 around the brush to contain the unsintered powder removed from the drum and direct that powder to a waste bin (not shown).

Using the BBR mechanism, the three dimensional printer can be configured to brush off unsintered powder from the drum to prevent the detrimental impact of powder accumulation. In one embodiment, the unsintered powder is removed from the drum from every $N^{th}$ layer of the object being assembled, thereby compensating for the relatively fast rate of build-up compared to the sintered material. If unsintered powder is retained to construct a support for the object, for example, the unsintered powder may be removed from the drum every $10^{th}$ image. This is particularly advantageous where the density of the sintered powder is 60-90% that of the unsintered powder, thereby allowing the 10 layers of sintered material to "catch up" and vertically align with the 9 layers of unsintered support. This results in supports that are easier to remove and objects having layers that are better welded together.

Figure 15:
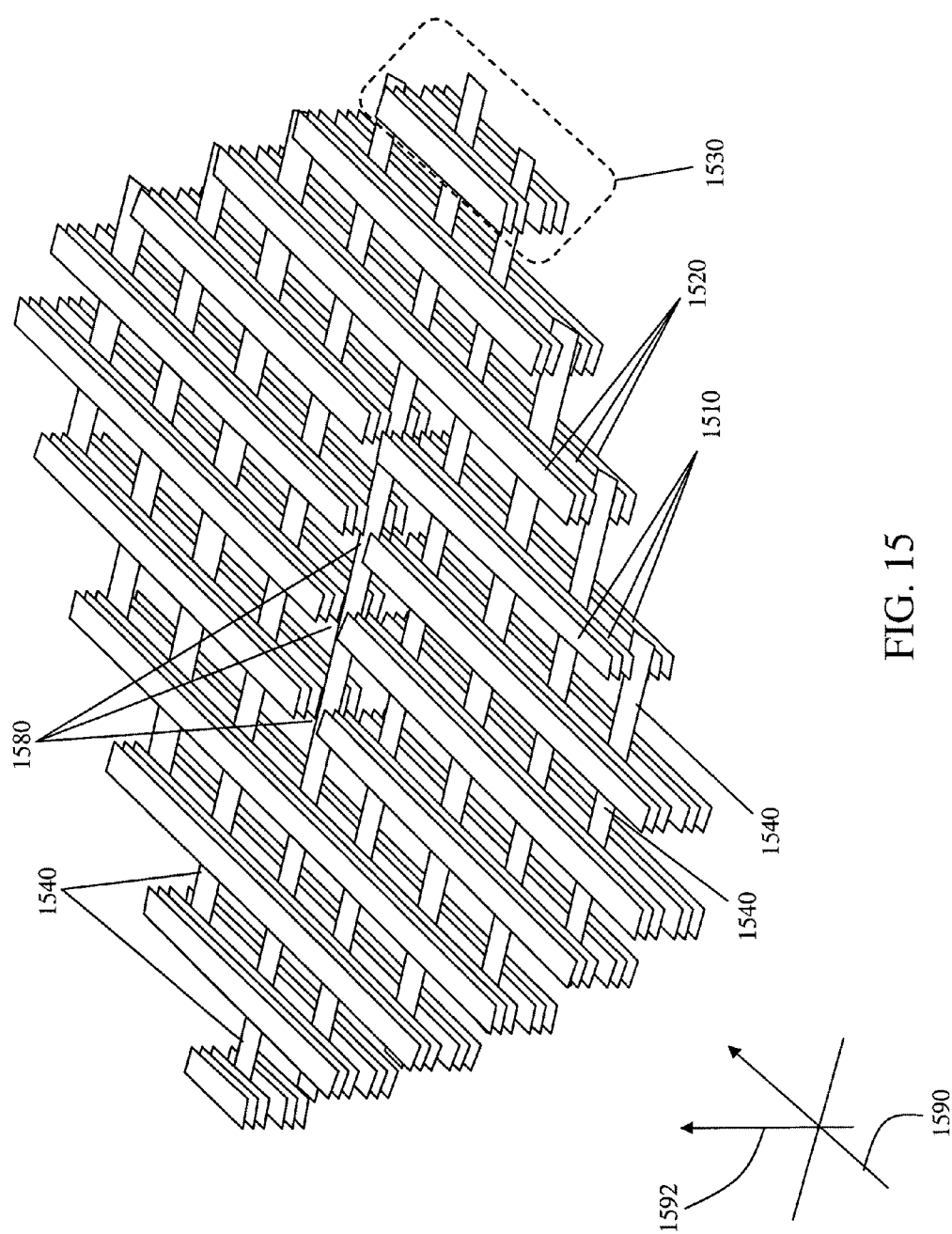
FIG. 15 is a perspective view of a portion of support structure comprising a plurality of hatches and cross hatching, in accordance with one embodiment of the present invention.

The strength of the powder supports assembled underneath and around the periphery of an object may be enhanced using a support structure including a combination of sintered sections, partially sintered sections, or a combination thereof. This type of support, shown in FIG. 15 for example, comprises a plurality of sintered line segments 1510, 1520 aligned parallel in the direction 1590 of layer roll-off. The line segments of the pattern, namely a hatch pattern, are separated by a distance just large enough to prevent the line segments from fusing together. This pattern is repeated across in width of the layer of support structure in the horizontal direction perpendicular to the roll-off direction. The pattern is also repeated in the vertical direction 1592 for a predetermined number of layers, the sintered line segments of each layer being stacked directly on top of the preceding layer to form vertical walls 1530 or walls biased on a diagonal. Each wall 1530 may be segmented with a gap 1580 in the lateral direction parallel to the roll-off direction to yield a maximum length of one inch, for example, to facilitate removal of the support from the object after final assembly. One skilled in the art will appreciate that the vertical walls 1530 is one of a plurality of sintered support patterns that may be used including columns, honeycomb, or fractal, for example.

After the predetermined number of layers are stacked to form walls, one or more cross hatch line segments 1540 are formed in the layers of the support structure to link the walls 1530 together. The vertical pattern of parallel line segments and cross hatching may be repeated as needed until the underlying support or lateral support for the object is completed.

In some embodiments, the sintered line segments that are stacked to form walls are generated from sequential layers of images formed on the drum. That is, a wall formed from 10 line segments is generated from the line segments of 10 consecutive images. To enhance the removability of the support structure, however, one or more of the walls in some other embodiments are formed by skipping one or more layers of line segments. That is, a wall formed from 10 line segments may be generated by line segments of 11 or more non-consecutive images, e.g., line segments from layers 1-5 and layers 7-11 with no contribution from layer 6. While the object is generated from the combination of each of the 11 or more images, select layers that might otherwise form the walls are removed in order to prevent the support structure from building up at a rate greater than the object.

The width of the walls and the cross hatches is approximately 0.080 inches in the preferred embodiment. The energy with which the line segments are formed may fully sinter or partially sinter the powder for the supports depending on the support strength, rigidity, and removability required. The strength is required to overcome the compressive pressures of the drum during layer roll-off as well as the tensile forces of the curl forces generated by internal stresses in the imaged part, which are caused by temperature gradients in the part.

Another technique to enhance the ability of a support removal entails sintering a border around the support structure where the support extends further in the lateral direction that the object. In the preferred embodiment, the support structure follows the general contour of the object being assembled but with an additional lateral offset that increases the footprint of the support structure over that of the footprint of the object. The support structure may further include an outer contour line that encloses the entire support structure. To prevent the support border from becoming too strong or rigid, the border may be intermediately segmented in both the horizontal direction as well as the vertical direction. The support structure may further include an inner contour line that is in proximity to but offset from the outer contour line of the part at that layer. The nominal distance between the support's inner contour line and the object's outer contour line preferably ranges between 5 mils and 25 mils. A distance of 5 mils is effective at firmly holding the object within the support structure, while a distance of 25 enables the support to be broken away from the object with ease. In some embodiments, distance between the object and individual walls of the support structure may alternate between 5 mils and 25 mils from one wall to the next adjacent wall in order to achieve a combination of firm support and easy support removal. Similarly, the distance between the object and walls of the support structure may alternate between 5 mils and 25 mils between successive layers as well.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A method of generating an object assembled from a plurality of cross sections, the method comprising the steps of:
   generating a layer comprising sinterable powder on a first surface, wherein the layer comprises a bulk layer of sinterable powder from which one or more of said cross sections is imaged;
   generating a sintered image using a radiant energy source configured to fuse at least a portion of the layer of sinterable powder while on the first surface;
   removing unsintered powder from the first surface; and
   transferring the sintered image from the first surface to the object being assembled, wherein the object is supported by a lift,
   wherein transferring the sintered image comprises pressing the object against the sintered image to provide a substantially uniform pressure across the sintered image being transferred to the object,
   wherein transferring the sintered image from the first surface to the object being assembled comprises transferring the sintered image from a drum to the object supported by a lift,
   wherein removing unsintered powder comprises removing the unsintered powder after generating the sintered image and before transferring the sintered image.

2. The method of claim 1, wherein pressing the object against the sintered image comprises providing a substantially uniform pressure for substantially all of the sintered images comprising the object.

3. The method of claim 1 further comprising adjusting the height of the object relative to the first surface.

4. The method of claim 3, wherein adjusting the height of the object relative to the first surface comprises adjusting the position of a lift configured to support the object.

5. The method of claim 3, wherein adjusting the height of the object relative to the first surface comprises applying a determined force between the object being assembled and the sintered image.

6. The method of claim 5, wherein the determined force is a time-varying force.

7. The method of claim 6, wherein the time-varying force varies while the sintered image is transferred to the object being assembled.

8. The method of claim 6, wherein the time-varying force varies based upon the shape of the sintered image.

9. The method of claim 1, wherein the sinterable powder comprises a polymer.

10. The method of claim 9, wherein the polymer is selected from the group consisting of: nylon 11 and nylon 12.

11. A method of generating an object assembled from a plurality of cross sections, the method comprising the steps of:
    generating a layer comprising sinterable powder on a first surface, wherein the layer comprises a bulk layer of sinterable powder from which one or more of said cross sections is imaged;
    generating a sintered image using a radiant energy source configured to fuse at least a portion of the layer of sinterable powder while on the first surface;
    removing unsintered powder from the first surface; and
    transferring the sintered image from the first surface to the object being assembled,
    wherein removing unsintered powder comprises removing the unsintered powder after generating the sintered image and before transferring the sintered image.

12. The method of claim 11, wherein removing unsintered powder comprises brushing the unsintered powder from the first surface.

* * * * *